United States Patent
Peng et al.

(10) Patent No.: US 10,671,427 B2
(45) Date of Patent: Jun. 2, 2020

(54) SNAPSHOT ISOLATION IN GRAPHICAL PROCESSING UNIT HARDWARE TRANSACTIONAL MEMORY

(71) Applicants: Lu Peng, Baton Rouge, LA (US); Sui Chen, Sunnyvale, CA (US)

(72) Inventors: Lu Peng, Baton Rouge, LA (US); Sui Chen, Sunnyvale, CA (US)

(73) Assignee: BOARD OF SUPERVISORS OF LOUISIANA STATE UNIVERSITY AND AGRICULTURAL AND MECHANICAL COLLEGE, Baton Rouge, LA (US)

(*) Notice: Subject to any disclaimer, the term of this patent is extended or adjusted under 35 U.S.C. 154(b) by 110 days.

(21) Appl. No.: 16/016,127

(22) Filed: Jun. 22, 2018

(65) Prior Publication Data

US 2018/0373560 A1    Dec. 27, 2018

Related U.S. Application Data

(60) Provisional application No. 62/523,459, filed on Jun. 22, 2017.

(51) Int. Cl.
*G06F 9/46*      (2006.01)
*G06F 12/08*     (2016.01)
*G06F 12/0855*   (2016.01)
*G06F 16/22*     (2019.01)

(52) U.S. Cl.
CPC .......... *G06F 9/467* (2013.01); *G06F 12/0855* (2013.01); *G06F 16/2282* (2019.01); *G06F 2212/1016* (2013.01)

(58) Field of Classification Search
None
See application file for complete search history.

(56) References Cited

U.S. PATENT DOCUMENTS

| 2006/0041602 A1* | 2/2006 | Lomet ................. G06F 11/1471 |
| 2011/0153566 A1* | 6/2011 | Larson .................... G06F 9/466 707/638 |
| 2014/0149353 A1* | 5/2014 | Lee ....................... G06F 16/174 707/639 |
| 2016/0239410 A1* | 8/2016 | Bhattacharjee ......... G06F 9/467 |

(Continued)

OTHER PUBLICATIONS

Litz et al. (SI-TM: Reducing Transactional Memory Abort Rates through Snapshot Isolation). ACM 978-1-4503-2305-5, pp. 383-397, Mar. 1-4, 2014 (Year: 2014).*

(Continued)

*Primary Examiner* — Kaushikkumar M Patel
(74) *Attorney, Agent, or Firm* — Keith G. Haddaway; Venable LLP; Ryan T. Ward

(57) ABSTRACT

Snapshot Isolation (SI) is an established model in the database community, which permits write-read conflicts to pass and aborts transactions only on write-write conflicts. With the Write Skew Anomaly (WSA) correctly eliminated, SI can reduce the occurrence of aborts, save the work done by transactions, and greatly benefit long transactions involving complex data structures. Embodiments include a multi-versioned memory subsystem for hardware-based transactional memory (HTM) on the GPU, with a method for eliminating the WSA on the fly, and incorporates SI. The GPU HTM can provide reduced compute time for some compute tasks.

14 Claims, 17 Drawing Sheets

(56) References Cited

U.S. PATENT DOCUMENTS

2017/0132139 A1* 5/2017 Busaba .................. G06F 9/3005
2017/0220617 A1* 8/2017 Bortnikov ............ G06F 16/2329
2018/0144014 A1* 5/2018 Mittal .................. G06F 16/2322
2018/0253467 A1* 9/2018 Gurajada ............ G06F 11/1471

OTHER PUBLICATIONS

Jafri et al. (Wait-n-GoTM: Improving HTM Performance by Serializing Cyclic Dependencies). ACM 978-1-4503-1870-9, pp. 521-534, Mar. 16-20, 2013 (Year: 2013).*

* cited by examiner

| 30-Bit Block Address | 2-bit Entry Type | 37-bit Content | | | |
|---|---|---|---|---|---|
| Type 0: Unused | 00 | 37-bit Unused | | | |
| Type 1: Plain Sharer ID | 01 | 10-bit Txn ID | 10-bit Txn ID | 2-bit Count | 5-bit Unused |
| Type 2: Root Bit Vector | 10 | 32-bit Root Bit Vector | | | 5-bit Unused |
| Type 3: Leaf Bit Vector | 11 | 32-bit Leaf Bit Vector | | | 5-bit Leaf ID |

FIG. 8

SNAPSHOT ISOLATION IN GRAPHICAL PROCESSING UNIT HARDWARE TRANSACTIONAL MEMORY

PRIORITY

This application claims priority to U.S. Provisional Patent Application No. 62/523,459, filed Jun. 22, 2017, the contents of which are incorporated herein in their entirety.

STATEMENT OF GOVERNMENTAL INTEREST

This invention was made with government support under Grant Numbers CCF-1422408 and CNS-1527318 awarded by National Science Foundation. The government has certain rights in the invention.

BACKGROUND

Transactional Memory (TM) is a programming model used with the intention of making programming with threads simpler, with the goal of synchronizing access to data shared between several threads into transactions. Each transaction is executed atomically, meaning that they will either succeed and commit to the data store, or abort and restart. In addition, transactions are isolated from one another such that each transaction sees a consistent view of the memory. In other words, TM is a programming model that enables a series of read and write operations to complete atomically, similar to an atomic compare-and-swap command. A transaction should be aborted if it can result in inconsistent state resulting from concurrent reads/writes by other transactions into the system.

Many TM system proposals range from hardware to software and hardware-software co-designs. When multi-core and many-core processors emerged, TM innovation began to focus on scalability of TM systems and interoperation of different TM systems. TM has been implemented in consumer products such as the Haswell and its successors, from Intel Corporation of Mountain View, Calif., United States. A Graphics Processing Unit (GPU) is a throughput-oriented computing device characterized by large arithmetic density, high memory bandwidth and a high degree of parallelism. GPU design is evolving towards a general-purpose computing device, with growing support for irregular workloads and data structures that are traditionally non-GPU oriented.

Recently, hardware based TM systems for GPUs have been proposed, offering performance comparable to fine-grained locking (synchronizations between threads in thread blocks) that are as easy to use as coarse-grained locking (synchronizations between threads), making it a competitive tool for exploiting a full potential of GPUs. Most existing TM systems implement a 2-PhaseLocking (2PL) concurrency control mechanism, which aborts transactions on both write-read conflicts and write-write conflicts.

SUMMARY

An exemplary method performed according to the concepts disclosed herein can include: receiving, at a cache associated with a processor, a request from a single-instruction, multiple-transaction (SIMT) core of the processor; generating, in response to the request, at least one copy of a row of a memory associated with the processor, the at least one copy stored in the cache; recording, during transactions executed by the processor, multiple versions of the row of the memory, each version in the multiple versions associated with a respective copy in the at least one copy of the row of the memory; performing, at the cache, dependent loop detection on the multiple versions; and aborting write-write transactions based on the dependent loop detection.

An exemplary graphical processing unit configured according to the concepts disclosed herein can include: at least one processor; and at least one non-transitory memory device having a cache, wherein the at least one non-transitory memory device is configured to perform operations in association with the at least one processor, the operations comprising: receiving, at the cache, a request from a single-instruction, multiple-transaction (SIMT) core of the at least one processor; generating, in response to the request, at least one copy of a row of memory within the at least one non-transitory memory device, the at least one copy stored in the cache; recording, during transactions executed by the at least one processor, multiple versions of the row of memory within the at least one non-transitory memory device, each version in the multiple versions associated with a respective copy in the at least one copy of the row of memory within the at least one non-transitory memory device; performing, at the cache, dependent loop detection on the multiple versions; and aborting write-write transactions based on the dependent loop detection.

An exemplary non-transitory computer-readable storage device configured as disclosed herein can have instructions which, when executed by a computing device, cause the computing device to perform operations including: receiving, at a cache, a request from a single-instruction, multiple-transaction (SIMT) core of the computing device; generating, in response to the request, at least one copy of a row of memory associated with the computing device, the at least one copy stored in the cache; recording, during transactions executed by the computing device, multiple versions of the row of the memory, each version in the multiple versions associated with a respective copy; performing, at the cache, dependent loop detection on the multiple versions; and aborting write-write transactions based on the dependent loop detection.

BRIEF DESCRIPTION OF THE DRAWINGS

FIG. 8 illustrates, by way of example, a diagram of an embodiment of a structure of an SRL.

DETAILED DESCRIPTION

Figure 1:
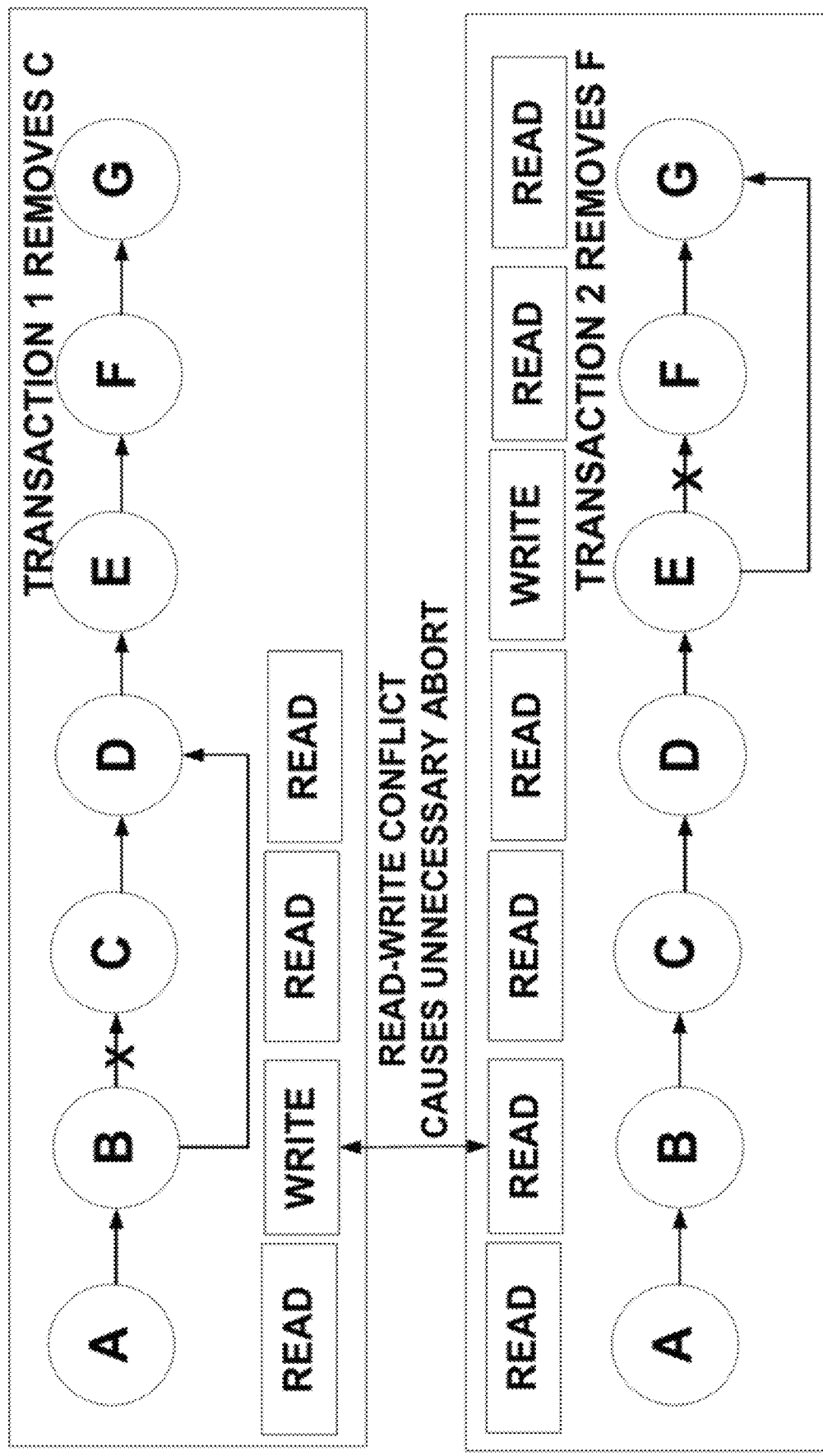
FIG. 1 illustrates, by way of example, a diagram of an embodiment of an unnecessary abort.

One or more embodiments of the disclosure regard one or more hardware, software, firmware, and/or logical modifications to a GPU TM. The modification(s) may provide reduced compute time as compared to prior GPU TM.

Snapshot Isolation (SI) is an established model in the database community, which permits write-read conflicts to pass and aborts transactions only on write-write conflicts. In comparison to 2PL, Snapshot Isolation (SI) is another mechanism that only aborts on write-write conflicts, and not on read-write conflicts, and can greatly improve performance. However, at the same time, SI can permit a Write Skew Anomaly (WSA) to obtain incorrect outputs. With the WSA eliminated, SI can reduce the occurrence of aborts, save work done by transactions, and greatly benefit long transactions involving complex data structures.

GPUs are evolving towards a general-purpose computing device with growing support for irregular workloads, including TM. As disclosed herein, the usage of SI TM, with the WSA accounted for, results in improved GPU performance. Embodiments herein can may include a multi-versioned memory subsystem for hardware-based TM on the GPU. One or more embodiments can include a method for eliminating a WSA on the fly. One or more embodiments can incorporate SI therein.

Experimental results (accompanying FIGS. 11-19) support that SI can effectively boost the performance of dynamically sized data structures such as linked lists, binary trees and red-black trees, sometimes by as much as 4.5 times, which results in improved overall performance of benchmarks using these data structures.

As previously discussed, embodiments herein can include using SI in a GPU-based hardware TM system. One or more embodiments can provide improved performance for complex transactions involving dynamically sized data structures, such as the linked list and search trees, and a solution for eliminating the WSA on the fly. One or more embodiments, can include one or more of the following: a versioned memory system, such as for quickly creating versions and enabling SI on the GPU; a method for detecting dependency loops on the fly and eliminating the WSA that can scale to hundreds of concurrent transactions on the GPU; and an SI-based hardware TM on the GPU brings speed up over the baseline system that aborts on all read-write conflicts in applications that use dynamically sized data structures.

A TM system usually provides a certain isolation level by implementing one concurrency control mechanism. A purpose can include making sure concurrent read-writes always result in valid system states. This can be accomplished by detecting and resolving conflicts. A conflict is a condition when two or more transactions access one data item in memory simultaneously, and at least one of the transactions is a write. A frequently used conflict resolution method is to abort-all-but-one transaction in a read-write or write-write conflict. With this abort-all-but-one mechanism, concurrent accesses will be split into disjoint sets with no intersections in between. This abort-all-but-one mechanism can also be used with the 2PL concurrency mechanism, with the first phase called the "expanding phase," when transactions compete for and acquire locks, and the second phase called the "shrinking phase," when locks are released.

This conflict resolution mechanism is pessimistic in that it may abort more transactions than what is necessary, such as to maintain a consistent program state. An example of why it can result in unnecessary aborts can be seen in FIG. 1. In FIG. 1, transactions T1 and T2 attempt to remove nodes C and F from a linked list. Both transactions first iterate through the list to find the element to be removed and its neighbors and then change the list. In the example of FIG. 1, T1 modifies B to remove C from the list, but T2 reads node B when it is looking for node F, so this pair is considered in conflict, and one of them will be aborted, per the abort all but one mechanism. But this abort is not necessary since the outcome of T1 and T2 both committing is still a valid linked list with nodes C and F removed. The pessimistic approach is one reason why TM systems sometimes run slower than fine-grained locking. In fine-grained locking (synchronizing threads in thread blocks), a section can be made small enough to lock only the most relevant data and block the smallest set of conflicting transactions. The lock can also be acquired using the best strategy. Using the same example illustrated in FIG. 1, when T1 locks nodes B, C and D and T2 locks E, F, and G using fine-grained locking, the abort can be avoided. However, fine-grained locking requires extra efforts. For example, a lock-sorting algorithm can be used with fine-grained locking to avoid live-locks and dead-locks, so fine-grained locking can be a more difficult task than using TM.

Figure 2:
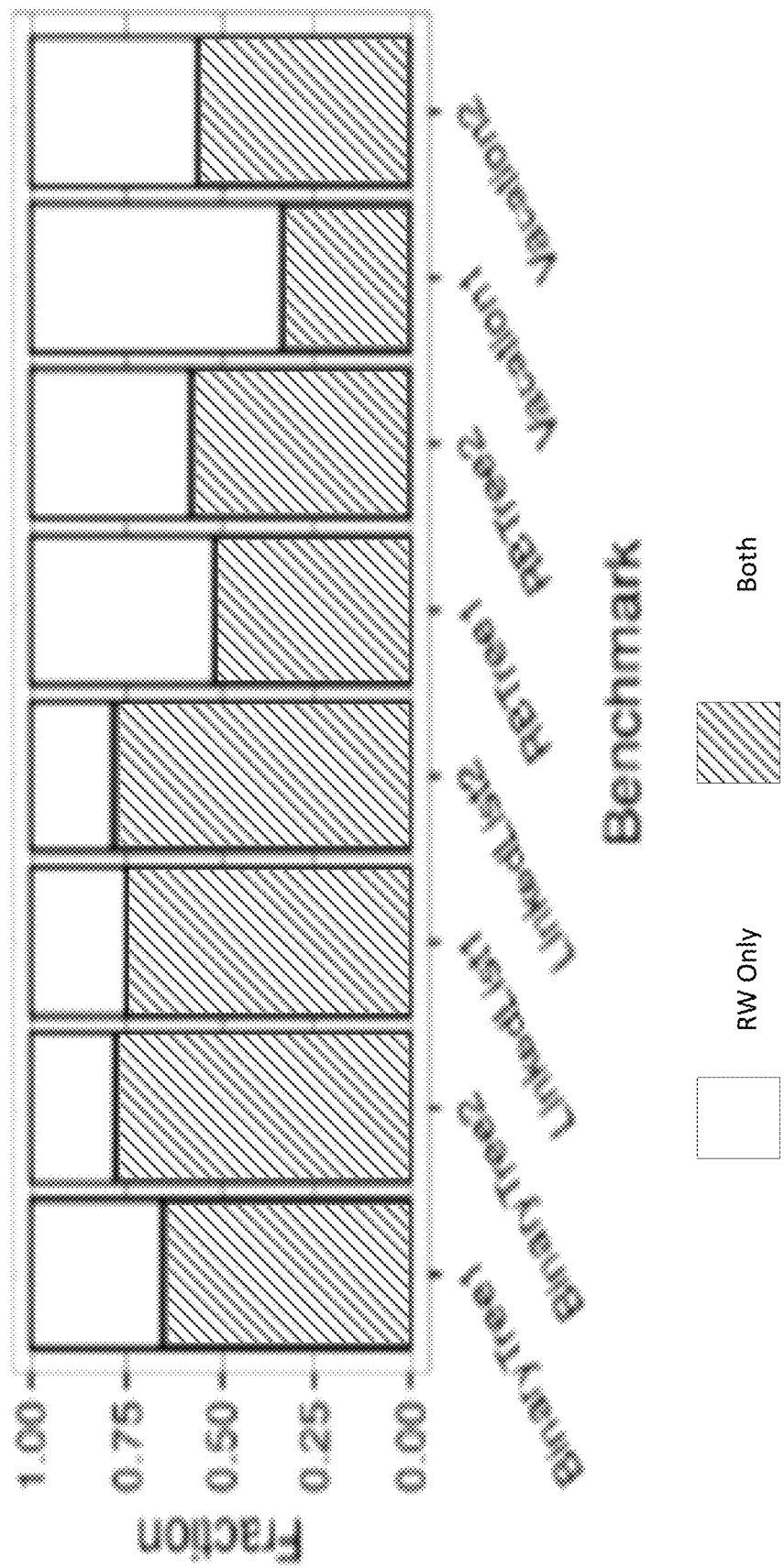
FIG. 2 illustrates, by way of example, a graph of types of conflicts between transaction pairs in some GPU TM workloads.

In contrast, SI is different from 2PL, as SI allows write-read conflicts to pass. SI makes a guarantee that every transaction will see a consistent snapshot of the entire system and it will successfully commit only if it doesn't conflict with any concurrent updates made during its lifetime. This allows a transaction to commit its tentative changes in isolation, without being affected by other transactions. In one SI protocol, read operations will always complete and only write-write conflicts will be aborted. FIG. 2 illustrates, by way example, a diagram of an embodiment of conflicts between transaction pairs in some GPU TM workloads. Note that in many conflict pairs, only read-write conflicts are involved. The rest may include both read-write and write-write conflicts.

SI can accelerate applications that include transactions aborted by read-write conflicts. For example, a breakdown of conflict types between temporally-overlapping transaction pairs in some GPU programs is shown in FIG. 2. FIG. 2 illustrates that transactional applications utilizing data structures such as binary search trees, linked lists and red-black trees contain more read-write only conflicts than other applications. These data structures are dynamically sized and are much easier to implement using TM than fine-grained locks.

However, SI suffers from a well-known problem called the WSA. The problem is that transactions executed using SI produce correct results when running alone from their own snapshots, but often produce incorrect results when running together. This is a result of SI not providing full serializability, and must be addressed for an SI-based system to execute correctly and be useful. One method to ensure correctness is to identify the cause of the anomalies, either manually or by static/dynamic analysis and modify the application accordingly by introducing artificial locking or introducing write-write conflicts. There exist educational campaigns for database users that attempt to make the users aware of, and to prevent, the WSA. One notable theoretical foundation to these methods includes types of dependency graphs, such as the Read Dependency Graph (RDG), which represents the relative serialization order of transactions that can create a system state equivalent to when transactions are concurrently executed.

Consider the example of SI to TM in an SI-TM system running on a CPU. The system resolves the WSA through a trace driven approach in which transaction execution traces are generated during runtime to form a dynamic dependency graph (DDG). The DDG is collapsed into an RDG, with edges in the RDG representing the dependency loops in DDG, and vertices in the RDG representing the source code locations that generate the dependency loops. The problem of eliminating dependency loops is solved in the trace-driven approach by choosing a set of the read operations ("dangerous reads"), and converting the selected read operations set into write operations, thereby introducing runtime write-write conflicts (instead of read-write conflicts), and eliminating the WSA. As with many test-driven approaches, the coverage of skew detection depends on the size of the sampled runs. To catch all possible "dangerous reads", many experiments/executions may be required.

Recent developments in database and coherence have demonstrated ways to eliminate cyclic read-write dependencies in database systems and in memory dependency analysis. The work in this area has outlined the building block for preventing the WSA on-the-fly in a TM system, thus saving the user from having to obtain execution traces and manually fix application source code.

Versioned Memory System

To meet a guarantee that transactions to see their own snapshots in isolation, an address should be allowed to map to multiple machine words, each of which can be a version (the terms "version" and "snapshot" are used interchangeably herein). This can be similar to a version control system or a checkpointing infrastructure, where new versions may be appended to reflect the changes of the tracked word, and old versions are kept for access to the word's history. In terms of its semantics, a version is the previous version combined with the changes between the two versions. In the example shown in FIG. 3, a linked list initially containing seven nodes has two nodes removed, then one more node removed, to leave four nodes. After each batch of removals, the linked list becomes a new version of itself, and any version itself is a valid linked list. Versions are also commutative, in the example of FIG. 3, Node D is removed from Version 1, but may alternatively be removed from Version 0. In either case, when all three nodes (B, F, and D as in FIG. 3) are removed, the result is Version 2. In this sense, a versioned memory system may be implemented as a collection of full snapshots, or the combination of snapshots and change sets.

Figure 3:
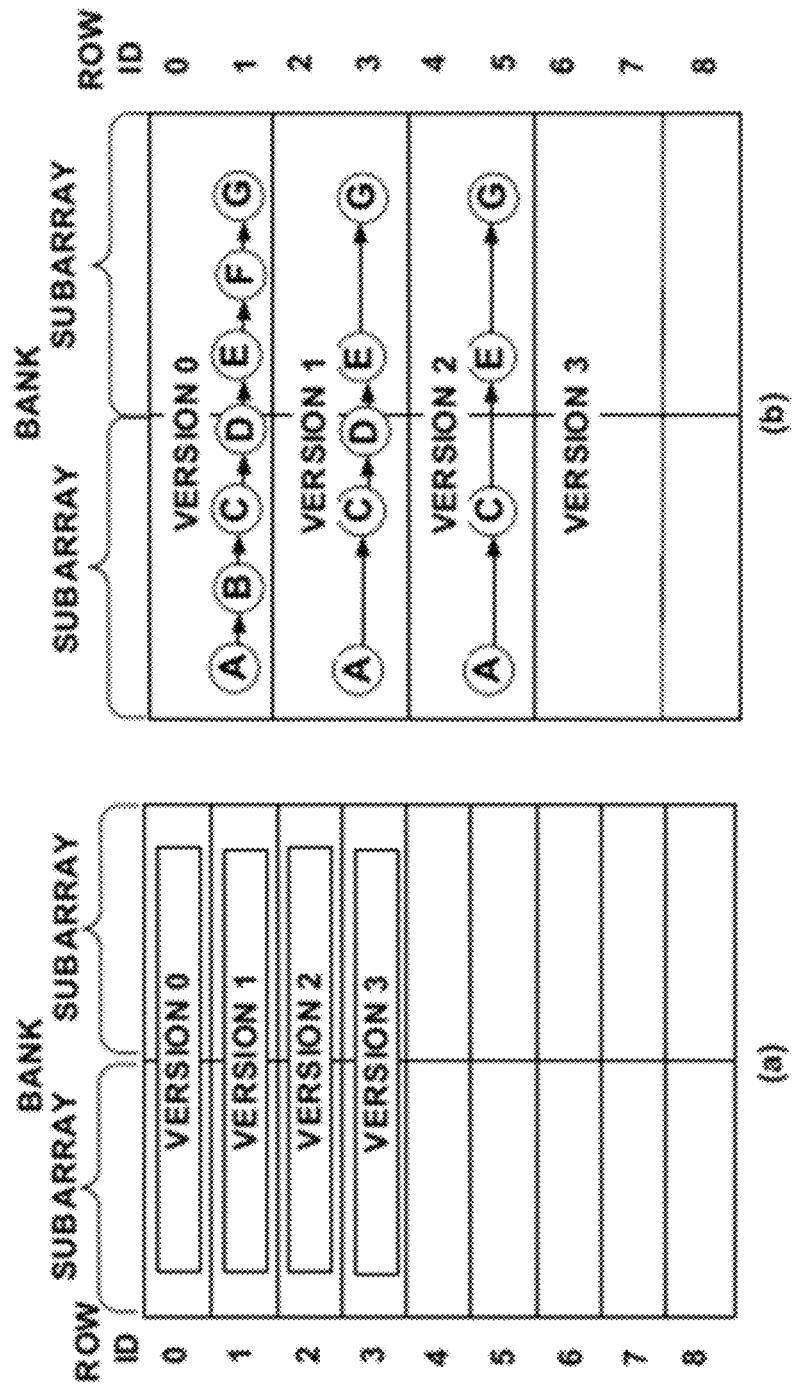
FIG. 3 illustrates, by way of example, a block diagram of an embodiment of versions and rows in a subarray of a bank of DRAM.

Discussed herein are embodiments that include the collection of full snapshots, as a quick row copy primitive makes it easier to create full snapshots than to keep track of change sets. One or more embodiments, may alternatively include snapshots and change sets. TM systems as disclosed herein can serve as a mechanism to handle conflicts, a result of accesses from different threads that overlap both in space and time. This means that spatial and temporal locality can exist in such access patterns. The locality is more noticeable in GPUs (compared to other processors), because of the large number of concurrent threads, as well as the lock-step execution pattern of threads in a warp. The high degree of parallelism can require a high-speed version creation, such as to not affect execution time. As shown in FIG. 3, a version may span (a) multiple subarrays and (b) multiple rows. Versions can track the evolution of data structures (shown in (b)).

Because of this access pattern and high speed version creation, embodiments configured as described herein can exploit the internal organization of DRAMs (Dynamic Random-Access Memory) to copy multiple kilobytes of data referred to as "rows" completely within memory, enabling fast creation of snapshots. A DRAM can be thought of as a collection of rows, each of which may be many kilobytes in size. The entire memory may be divided into multiple banks that can operate independently and each bank can be made up of multiple subarrays that have limited physical size, such as to help keep signal transmission time short. A number of DRAM rows that belong to the same subarray can be connected to a shared sense amplifier which can read and write the rows. By connecting multiple rows to the amplifier, data can be copied from one row to another, eliminating the need to copy data through the processor, all at the granularity of a row buffer, which is generally larger than cache lines. As such, the row copy operation can reach large bandwidth with very small energy consumption.

Although a "DRAM row" shares the same name as a "database row", a "DRAM row" is not a smallest atomic unit as a "database row"; the atomic unit in a transactional memory is usually a machine word, and a DRAM row is treated as and managed as a collection of many machine words. Thus, a granularity of a RowClone operation (multiples of DRAM rows) can be a bulk operation rather than a fine-grained operation, and is more suitable for copying whole snapshots than keeping fine-grained track of change sets. Given the RowClone mechanism, the versioned memory subsystem can do the following: 1) Layout the versions in a subarray-aware fashion such that the versions may be created using row copy, 2) Fetch a specific version to service accesses quickly, 3) Manage the lifetime of versions by creating and recycling versions, and 4) Remap the memory such that accesses to versioned/non-versioned regions works as expected.

Layout of Versions

RowClone operates by copying between rows belonging to a same subarray and version management can require multiple copy operations. Rows that belong to the same subarray can be allocated to the storage of versions, so that the copy operations can be made faster. A version may be larger than the row buffer size. In such a case, multiple rows may be allocated for a single version, as indicated in case (b) of FIG. 3.

Version Lifetime Management

The lifetime of a version can include four states (except Version 0, the initial version created at program start will enter state S3 by definition), some of which allow reads/writes as detailed in TABLE 1:

TABLE 1

| STATE | READ | WRITE |
| --- | --- | --- |
| S1. SPACE OF THE VERSION IS ALLOCATED AND CONTENTS OF THE PREVIOUS VERSION ARE COPIED TO IT | NO | NO |
| S2. THE CHANGES MADE BY THE COMMITTING TRANSACTIONS FROM A GPU THREAD WARP (EXECUTED IN LOCK STEP) ARE BEING WRITTEN TO THIS VERSION. MULTIPLE NON-CONFLICT CHANGES CAN BE WRITTEN TO IT; CONFLICTS ARE RESOLVED BY ABORTING SOME TRANSACTIONS | NO | YES |
| S3. WHEN WARP COMMIT IS FINISHED, THE VERSION WILL BE ASSIGNED A CREATION TIME AND WILL NOT BE WRITTEN TO; FUTURE TRANSACTIONS MAY START READING FROM IT | YES | NO |
| S4. THE VERSION IS RECYCLED, MARKED AS UNREADABLE WHEN NO TRANSACTIONS ARE READING FROM IT ANYMORE, AND IT SPACE IS RECYCLED | NO | NO |

Figure 4:
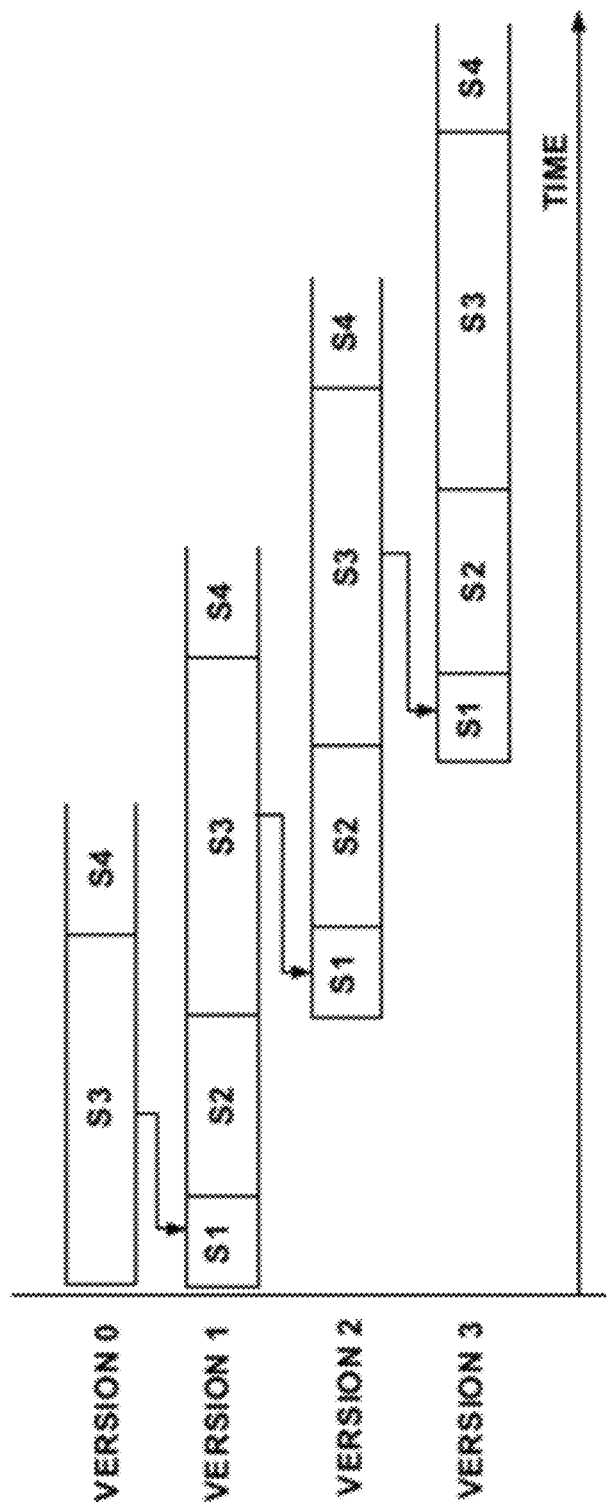
FIG. 4 illustrates, by way of example, a diagram of an embodiment of life cycles of versions and the changes in the states (S1-S4).

In addition to copying and recycling, transactional reads and writes interact with the versions as well. An example of how copying and recycling are involved in the different states is shown in FIG. 4. FIG. 4 illustrates, by way of example, life cycles of versions and corresponding changes in the states (S1-S4). Arrows in FIG. 4 denote copy operations. In the example of FIG. 4, four versions are shown. When there exists a version at state S3, its next version will enter state S1 and start copying. When a next version enters state S2, it may be used as a write target. At any given time, there exists at least one version that can be read from, and when there is not an ongoing copy, there exists one version to be written to. During the copying, transactions that are executing CAN read from previous versions which are in state S3. Therefore, the copy operations are overlapped with the transaction execution.

The total number of versions allocated can be a parameter determined at kernel launch. Due to the limit on the number of versions, versions can be recycled and enter state S4 when there are no references to them.

Accessing a Version

A version can be accessed with an address and a timestamp. The timestamp is compared with the timestamps of the existing versions that are in lifetime state S3, and the latest version that is created before the given timestamp can be the version that is accessed.

Memory Mapping

In a multi-version memory scheme, a version may cause multiple regions in the device memory space to become unavailable, similar to the way in which system memory is shared between the CPU and the GPU in certain heterogeneous architectures. Depending on the memory mapping scheme, versions can take up multiple disjoint regions in the memory space. For example, consider the following address mapping scheme:

Figure 5:
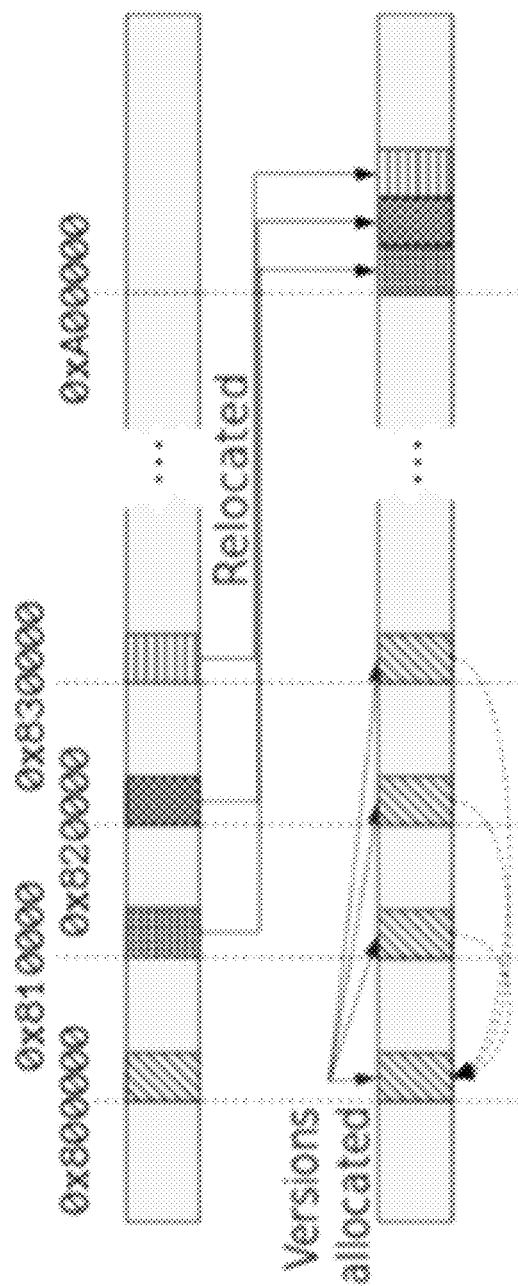
FIG. 5 illustrates, by way of example, a diagram of an embodiment of a memory mapping and reallocating scheme.

In this mapping scheme, R, B and C denote row, burst, and column addresses, respectively. Suppose addresses 0x800000-0x8003FF are allocated 8 versions, each with a size of 0x400 bytes, then addresses 0x801000-0x8013FF, 0x802000-0x8023FF, ... 0x807000-0x807FFF will be occupied. In this example, accesses to those addresses can be redirected to a reserved space, starting from 0xA00000, as illustrated in FIG. 5. FIG. 5 illustrates, by way of example, a diagram of an embodiment of a memory mapping and reallocating scheme. The purpose of reallocating the space occupied by versioned regions can be to recover a continuous memory space.

Accessing Versions Through the Version Index Table

To put the proposed multi-versioned memory in action, the list of versioned memory regions and their details can be stored in a Version Index Table (VIT). The details in the VIT can include the length of the regions, the reallocated location for the space occupied by the version(s), the creation times of the respective versions, and the reference counts to the versions. The table can be located on the same level as the L2 cache, through which all DRAM requests pass. A program may be allowed to allocate multiple versioned memory regions. In such embodiments, there can be multiple entries in the VIT. TABLE 2 is an example of a VIT:

TABLE 2

| VIT | | | | |
| --- | --- | --- | --- | --- |
| START ADDR | LENGTH | RELO-CATED | CREATION TIME | REFCOUNT |
| 0x800000 | 0x400 | 0xA00000 | {17, 123, 193, 255} | {1, 23, 50, 5} |
| 0x880000 | 0x10000 | 0xA10000 | {12, 144, 156, 300} | {0, 9, 35, 47} |

An access can be handled based on whether it is versioned or not. In the case of a versioned access, the version can be retrieved by the accompanying timestamp. For the example in TABLE 2, there exists two versioned memory regions, each having four versions. Access to 0x800000 in the first versioned region, when given timestamp between 123 and 192 inclusive, can be directed to 0x810000. A non-versioned access to 0x810000 cam be reallocated and be reading from 0xA00000. Other non-relocated accesses will proceed as normal. Reference Counts (REFCOUNT) can be incremented by transactions that read from the region for the first time and decremented by the aborting/committing transactions that have read from the region.

Resolving Write Skew Anomaly

According to prior work, a necessary condition for the WSA to occur is the presence of inter-transaction write-read dependency loops in the DDG. Thus, eliminating dependency loops prevents the WSA from happening. A mechanism for removing WSAs by detecting and breaking write-dependency loops that arise during SI is now described.

Detecting Dependency Loops Using Post-Dating

One issue inherent to GPU is scalability, which is at least a partial result of its concurrency. Because of the presence of up to thousands of concurrent threads, such as can be scattered throughout the system, the cost of communication can be high and the designer of a system can weigh multiple factors when deciding where to use broadcasts. This also makes a precise graph tracking mechanism impractical on the GPU, because the size of the graph grows as the program runs. To avoid building graphs with unbounded size, detecting dependency loops (note the term dependency loop to denote cyclic dependencies, to avoid confusion with clock cycles) on the fly can be accomplished using a post-dating mechanism. A dependency loop detection scheme is illustrated in FIG. 6.

Figure 6:
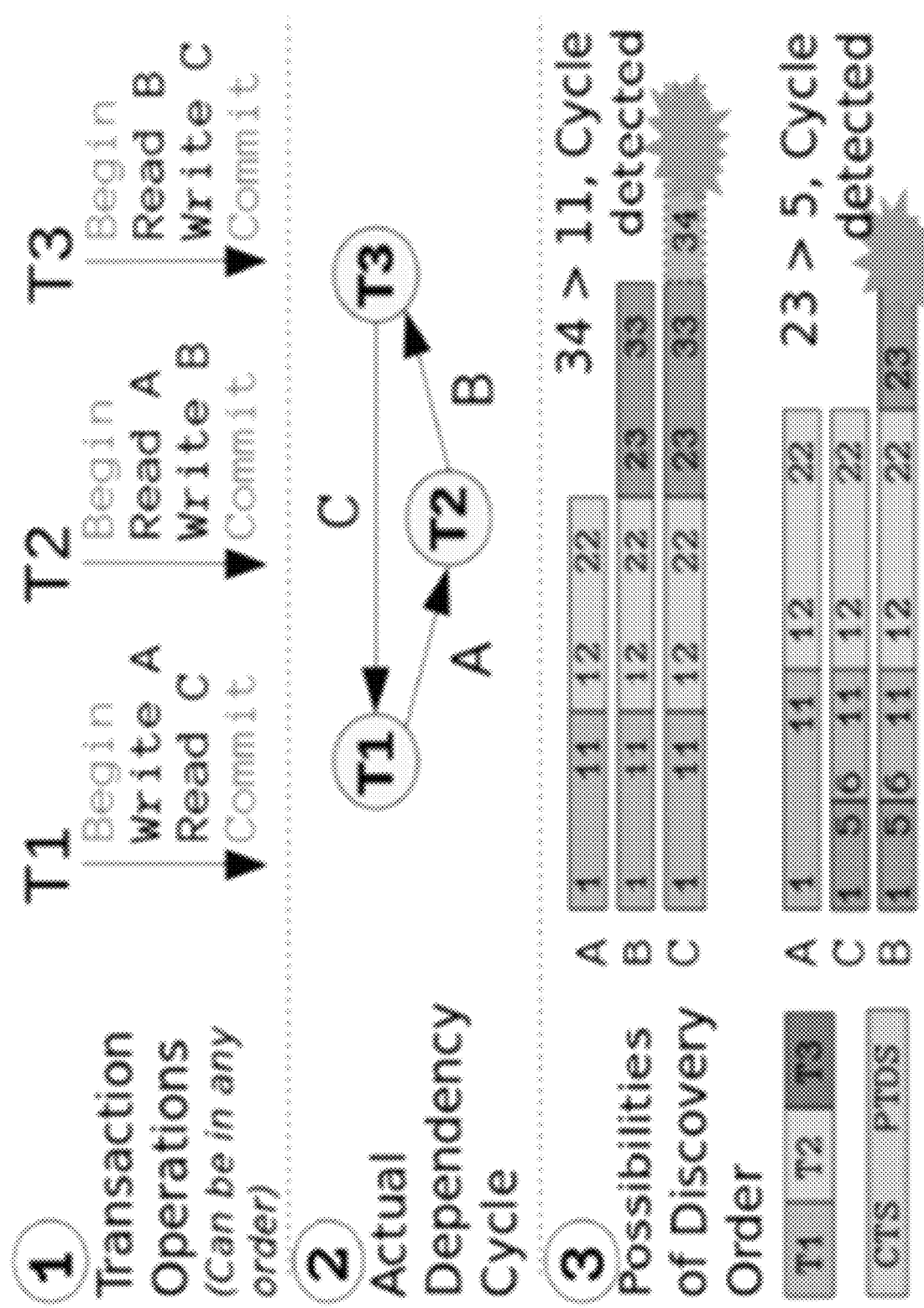
FIG. 6 illustrates, by way of example, a diagram of an embodiment of detecting dependency loops using post-dated logical timestamps and an increment of ten.

With a little modification, the scheme in FIG. 6 can be used to detect a dependency loop allowing tracking of dependency loops between transaction pairs, when both transactions are executing, as well as between executing and committed transactions.

In the post-dating method, each transaction can be assigned three numbers (e.g., integer, real, or other number) that are updated throughout the post-dating process, which are called the current logical timestamp (CTS), the post-dated logical timestamp (PDTS), and the previous logical timestamp (PrevTS), as shown in the Pseudocode below. Note that the timestamps reflect the ordering between the transactions, not the time at which the transactions start, or when transactional accesses take place, thus they are called logical timestamps, to avoid confusion with the time-based timestamps associated with the snapshots. When two transactions write and read the same address, a dependency edge between these two transactions is formed, pointing from the writer entity to the successor. The purpose of post-dating is to detect loops by updating the logical timestamps of predecessors and successors using a simple rule and checking the invariant that a transaction's CTS must be smaller than its PDTS, when the invariant is violated, a dependency loop is declared.

An example of the operation of the post-dating mechanism involving 3 transactions and 3 dependency edges is illustrated in FIG. 6. FIG. 6 illustrates, by way of example, a diagram of a post-dating mechanism that includes three dependency edges used to detect dependency loops using post-dated logical timestamps and an increment of ten. Note that discovery starting from B and C can be made equivalent to the illustrated example through rotating the edge numbers.

In the beginning, all transactions can be initialized with (CTS=1, PDTS=-1). Between transaction begin and commit, all the write and read operations (Transaction Operations) go through the post-dating process. When a pair of read and write operations on the same data is seen by the postdating mechanism, a dependency edge is discovered, which is denoted as edges A, B and C (Actual Dependency Cycle). Depending on the order in which the three edges are discovered by post-dating, the three transactions may obtain different CTS and PTDS logical timestamps (Possibilities of Discovery Order). When only two out of the three edges are discovered, the invariant is still maintained, but when the third edge is constructed, one of the transactions will discover a violation of the invariant.

In the first case in the Possibility of Discovery Order section, the three edges are discovered in the order of A, B, C. When C is being discovered, T1 sets its CTS to 34 since it's a successor to T3 in write-read dependency edge C, and T3 has a PTDS of 33, but 34 is greater than T1's PTDS of 11, thus violating the invariant. In the second case where the order is A, C then B, and when B is being discovered, T3 sets its CTS to 23, because it's the successor to T2 in edge B, but 23 is greater than T3's PDTS of 5, thus violating the invariant.

For the other cases, B, C, then A and C, A, then B are equivalent to A, B, then C; and B, A, then C and C, B, then A are equivalent to A, C, then B. This can be proven by rotating the edge names. In all the cases, the loop will be discovered. When the edges involve committed transactions, the committed transactions' CTS and PDTS will be set as usual; the only difference is when the committed transaction serves as the predecessor, Line 2 in the following pseudocode will be executed and the PrevTS will be returned.

Pseudocode of post-dating loop detection:

```
(Predecessor receives successor's PDTS and computes the logical
timestamp to be sent to the successor)
1 OnPredecessorReceivesTS(pred, succ->PDTS) {
2 if (pred is committed) return PrevTS
3 if (succ->PDTS == -1) {
4 if (pred->PDTS == -1)
5 pred->PDTS = pred->CTS + 10
6 } else if (pred->CTS >= succ->PDTS) {
7 if (pred->PDTS == -1)
8 pred->PDTS = pred->CTS + 10
9 } else {
10 midpoint = (pred->CTS + succ->PDTS) / 2
11 if (pred->PDTS > midpoint)
12 pred->PDTS = midpoint
13 }
14 return pred->PDTS
15 }
(Successor receives the updated logical timestamp from the predecessor)
16 OnSuccessorReceivesTS(pred, succ, timestamp) {
17 if (succ->PDTS != -1 && timestamp >= succ->PDTS) {
18 // Declare a dependency loop
19 } else {
20 succ->CTS = ts + 1
21 }
22 }
(At commit or abort)
23 AtCommitOrAbort(txn, ts) {
24 txn->PrevTS = txn->CTS
25 txn->CTS = ts + 1
26      xn->PDTS = -1
27
```

Figure 7:
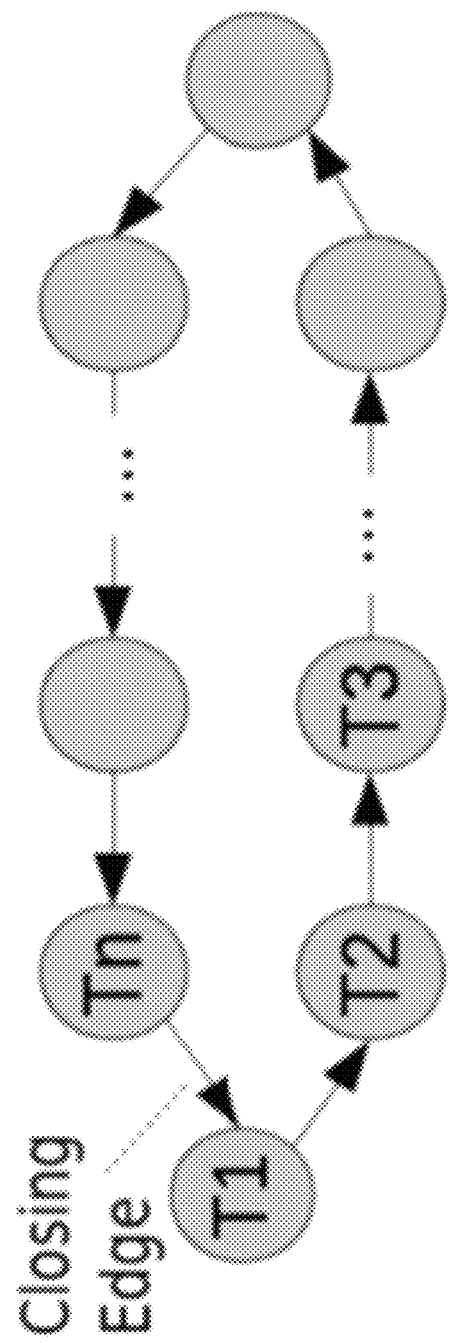
FIG. 7 illustrates, by way of example, a diagram of an embodiment of post-dating loops involving more than three transactions.

A dependency loop involving more than 3 transactions, such as the one in FIG. 7 can be discovered by the post-dating algorithm because: (a) Due to transitivity, given dependency T1->Tj in a chain of dependency edges, the invariants will always hold before a dependency loop is discovered, regardless of the order in which the dependency edges are post-dated: 1) PDTS of T1 must be greater than CTS of T1; (b) PDTS of Tj must be greater than PDTS of Tj and 3) CTS of Tj must be greater than PDTS of T1; and When the closing edge of a dependency of a loop is discovered, it will cause the aforementioned invariant to be violated, thus declaring a dependency loop.

The violation may also be caused by the logical timestamps running out of precision, resulting in false positives. Because false positives can only lead to aborts, it does not affect the correctness of the TM system.

Making Post-Dating Scalable

To make run-time costs manageable, a Single-writer paradigm can be used, allowing only one writer to own one machine word during the transaction execution stage. The choice of single-writer paradigm is reasonable in that the baseline SI aborts on write-write conflicts, so the additional writers are likely to get aborted. With the single-writer constraint, the difficulty of tracking dependency can be reduced, because it now becomes feasible to track the sole writers of the currently active words in this system. The Writer Table that stores the writer of words can be located on the same level as the L2 cache, so it is accessible to single-instruction, multiple-thread (SIMT) cores, and is on the path of transactional reads and writes. Transactions can consult this table to perform post-dating. To enable the writers to acknowledge readers of the request to update logical timestamps, a Scalable Reader List (SRL) can be implemented. Advantages of the SRL can include an efficient, scalable and exact scheme for representing readers, such as can be similar to an SCD directory. This scheme relies on efficient highly-associative caches proposed in the ZCache and the Cuckoo Directory.

The SRL is a directory with three types of entries illustrated in FIG. 8. The SRL can be indexed by an address (e.g., a 30-bit block address). Given an address, the relevant table entries can be fetched. The entries can be one of the four following types: (a) Type 0, Unused: the entry does not contain any useful information and can be deallocated; (b) Type 1, Plain Sharer ID: The entry contains 1 to 3 10-bit Transaction IDs. The number of entries is stored in the 2-bit field. (c) Type 2, Root-Level Bit Vector: Each bit in the 32-bit vector indicates whether one of the 32 leaf-level bit vectors are present; and (d) Type 3, Leaf-Level Bit Vector: Each bit in the 32-bit vector indicates whether each transaction in the group of 32 transactions is in the reader's list. The 5-bit field indicates the position of the Leaf in the Root and is used as an offset in the 1024-bit space. For example: the 11-th bit in the 21-th Leaf means the transaction with an ID of 32 21+11=683.

When a transaction reads an address, the read address and the reader can be appended to the SRL. A writer can use the SRL to find the writers and update the logical timestamps.

The organization of two-level 32-bit vectors allows at most 1024 concurrent transactions, which is greater than the number of concurrent transactions used in generating the Test Results shown below. More concurrent transactions can be achieved by increasing the number of bit vector layers.

Overhead

The overhead of the components required for detecting dependency loops is listed in TABLE 3, which is estimated based on CACTI using a 40 nanometer (nm) technology node. The total size of the four tables is designed to be 768 kB, which may be increased when necessary. The storage can be split into the following parts: (a) The Writer Table contains 3000 entries. The number is chosen to match the capacity of the SRL. Each entry in this table takes 40 bits (30 bits block address plus 10 bits writer ID), with a total size of 3000_40/8=15 kB; (b) The Logical Timestamp Table contains 1024 entries in total to accommodate 1024 concurrent transactions. (In the experiments described in the Test Results, the number is limited to 960 to match the baseline system). The entries may be directly mapped to each transaction, each containing three 24-bit logical timestamps, with a total size of 1024_24_3/8=12 kB; (c) The VIT takes 1 kB. Each entry in this table takes 193 bits (2×30-bit original and reallocated block addresses, 5 bits versioned area size and 8×32-bit creation times such that 60+8×32+5=193 bits). The space can accommodate 1024/(193/8)=42 versioned regions; and (d) The SRL takes the rest of the space, which is 768-15-12-1=740 kB. With each entry taking 69 bits (30 bits block address, 2 type bits, 37 bits of content), the space accommodates 740×1024/(69/8)≈87856 entries. This translates to 87856/33=2662 addresses in the worst-case sharer scenario (each address taking 33 entries). Since worst-case does not always happen, the space is large enough to cover the same number of unique addresses as the Writer Table (3000). TABLE 3 summarizes the sizes of various tables and the SRL:

TABLE 3 parameters of tables and the SRL

| | SIZE | AREA (mm$^2$) | POWER (mW) |
|---|---|---|---|
| WRITER TABLE | 15 kB | 0.12 | 31.5 |
| LOGICAL TIMESTAMP TABLE | 12 kB | 0.01 | 37.8 |
| VERSION INDEX TABLE | 1 kB | 0.005 | 3.2 |
| SCALABLE READER LIST | 740 kB | 5.0 | 2330 |

Post-dating based loop detection can be overlapped with loads and writes and therefore do not block. Logical timestamp updates originating from a transaction can be completed before the transaction starts committing. When any loop-detection tables (Writer Table or SRL) overflow, all future transactions, as well as transactions trying to obtain entry in any of those tables, can abort and wait for current transactions to either commit or abort and free up space in the tables. In the case that a timestamp in the VIT overflows, all current versions will be invalidated, all concurrent transactions will abort, and the timestamps can be reset to zero. In the case the post-dating timestamps (CTS and PDTS) overflow, all currently executing transactions can abort and restart the CTS and PDTS to zero.

Interaction with Existing GPU Hardware TM (HTM)

Figure 9:
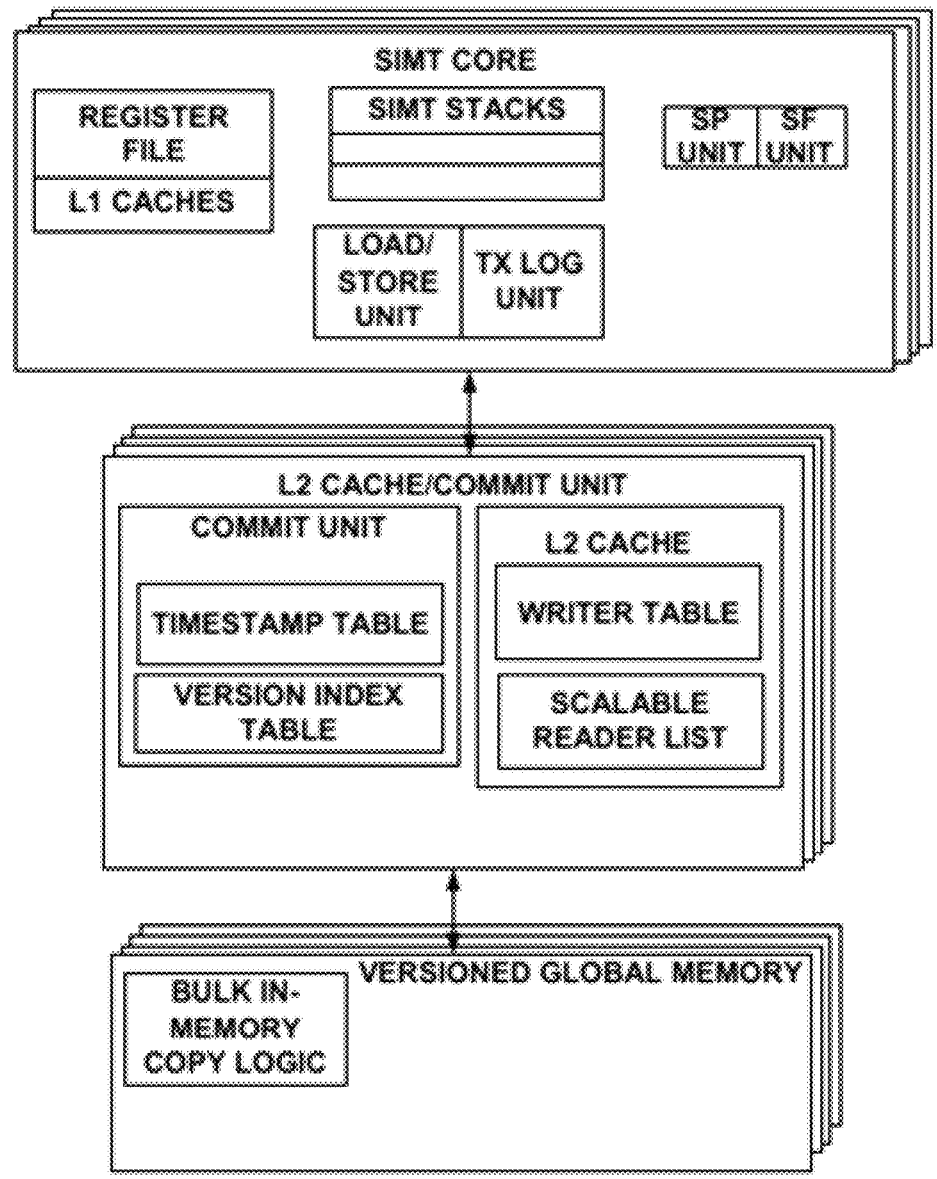
FIG. 9 illustrates, by way of example, a diagram of an embodiment of an SI-enabled GPU HTM architecture with GPU-specific components.

FIG. 9 illustrates exemplary hardware components added to the baseline GPU HTM hardware, WarpTM. These components enable SI and address the GPU-specific challenges for WSA elimination. First, GPUs usually lack the ability to broadcast cache line invalidation messages across cores as on the CPU. Second, the single-writer paradigm and the corresponding components help keep dependency tracking cost low.

Figure 10:
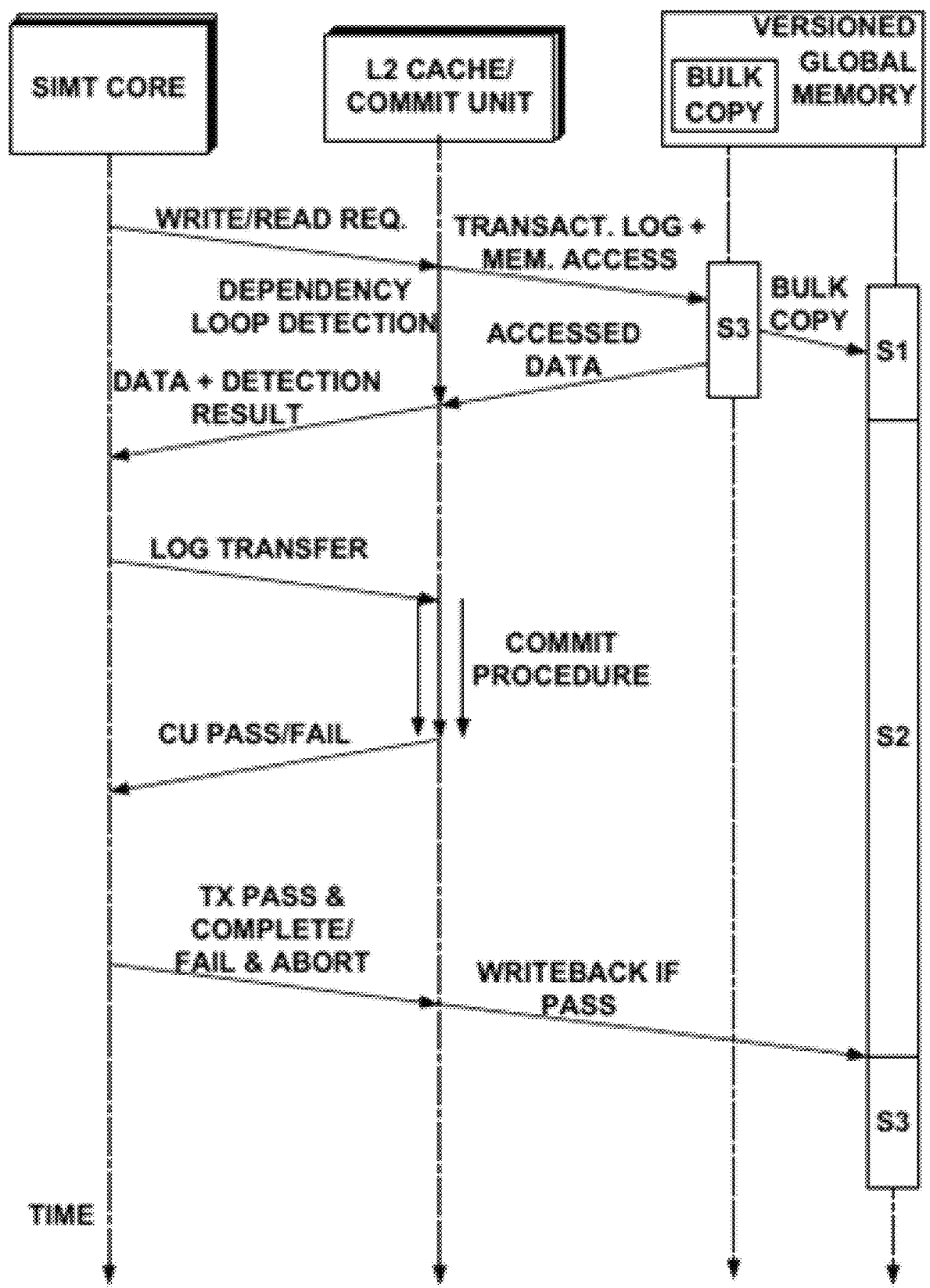
FIG. 10 illustrates, by way of example, a diagram of an embodiment of a transaction execution flow in an SI-enabled GPU HTM.

FIG. 10 shows how the hardware components are involved in the execution of transactions. The communications before the log transfer are part of a transmit execution procedure and the communication after the transmit execution procedure are part of a transmit commit procedure. At the start, transactions perform access to snapshots in the versioned memory by providing an address and its beginning timestamp. The corresponding version is accessed through the VIT (part of the L2 cache and commit unit (CU)), such as by using a process described previously. Transactional logging may be performed in the meantime. Dependency loop detection may be performed while transactional logging is being performed. For a write request, the writer's ID can be inserted into the Writer Table (part of the L2 cache and CU) if no other writers to the address currently exist, and all the readers of the same address are extracted from the SRL (part of the L2 cache and CU) and their timestamps are updated using the post-dating mechanism previously discussed. If there already exists a writer, the new writer is aborted, otherwise, the writer with a larger ID (or other heuristic) can abort. For read requests, the reader's ID can be inserted into the SRL (part of the L2 cache and CU), the writer of the read address can be found in the Writer Table, and the post-dating process as previously discussed can be run. The operations can overlap with the memory accesses and transactional logging, which involve global memory writes. These processes are usually long enough to hide the post-dating latency. The loop detection results can be sent back to the transaction that made the access, such as to abort transactions that may form dependency loops. Intra-warp conflict detection may not be needed as Warp TM performs this before a warp commits. The reason is intra-warp conflict detection aborts on all intra-warp read-write conflicts, which is not desirable in SI. The write sets of transactions are sent to the multiple CUs based on the memory partition the write destinations are in.

The function of the CUs in this system is simpler than that in WarpTM and KiloTM. With SI, the CU can only check transactional writes (the single writer limit apples to running transactions only, so it is still possible for multiple writes to the same address to exist in the commit stage) and aborts transactions when the writes conflict with other committing transactions. For at least this reason, the CU does not need to validate read requests and the read log is not transferred to the CU as it is in WarpTM. The commit procedure starts in each of the CUs at, after, or around the time the logs have been transferred to it. The transaction IDs can be removed from the Writer Table or SRL after a transaction passes the commit procedure.

During transaction execution and commit stages, the Bulk (In-Memory) Copy Unit (BCU) can copy the content of the current snapshot, currently in state S3 to the next snapshot, currently in state S1 (described about FIG. 4), in an asynchronous fashion. The BCU scans the addresses in the regions indicated in the VIT and issues copy commands to the corresponding rows, which will then copy the rows in parallel in the respective subarrays.

When the commit procedure is completed, the SIMT core can collect the results from the related CUs. When there is no write-write conflict in all its related CUs, the transaction is considered to have passed validation, and instructs the related CUs to write its changes to the new snapshot in state S2. Because GPU warps execute in lock step, a warp of transactions will be committing and writing back simultaneously, which allows the changes to be merged, reducing the number of versions that need to be created. When transactions from this warp finish writeback, the state of the snapshot can be changed from S2 to S3, becoming the "current transaction" from the future transactions' perspective, and will be given a stamp and be read from, as previously discussed. The execution flow repeat for the next transaction.

Number of Concurrent Snapshots

A finite number of concurrent snapshots can be set, such as to account for capacity constraints and/or other practical considerations. As described previously, there may exist multiple snapshots in state S3 which are available for read. The more concurrent snapshots, the more recent the versions read from by transactions will be.

A transaction can choose the snapshot to read from by its transaction start time and/or the timestamp of the snapshots, namely the latest version available at its start time. With a limited number of concurrent transactions, a transaction can be forced to read an older snapshot. This still results in correct execution; however, it is similar to having the transaction start much earlier but get stalled until its actual start time, which may increase the chance of an abort.

When a transaction starts, the reference count of the snapshot it is using can be incremented by 1. When it commits or aborts, the count is decremented by 1. When it restarts from an abort, it can choose a latest version in the pool of available snapshots, so older snapshots can eventually be referenced by no transactions. Then, it will be garbage-collected to make room for new versions.

Note that some applications may not have dynamic data structures as those shown in FIG. 2, and SI may not have performance benefits for those applications. The SI mechanism can be turned off and a normal baseline configuration may be used to avoid runtime overhead in this case.

Test Results

The disclosure now turns to experimental data regarding the concepts disclosed herein, and specifically implementation of those concepts in an exemplary embodiment. This experimental data is illustrated, at least in part, in FIGS. 11-19.

Parameters of an experiment for SI are provided in TABLE 4.

TABLE 4

| GPU | |
|---|---|
| SIMT Cores | 15 |
| SIMD Width | 16 × 2 |
| Warps/Threads per Core | 48 warps × 32 = 1536 threads |
| Memory Partitions | 6 |
| Core/Interconnect/Memory Clock | 1400/1400/924 MHz |
| Warp Scheduler Count | 2 per Core |
| Warp Scheduler Policy | Greedy-then-oldest |
| L1 Data Cache per Core | 60 KB/48 KB, 128 line, 6-way (not caching global accesses) |
| Shard Memory per Core | 16 KB |
| Interconnect Topology | 1 Crossbar per Direction |
| Interconnect Bandwidth | 32 B/cycle = 288 GB/s per direction |
| Interconnect Latency | 5 Cycles to Traverse |
| DRAM Scheduler | Out-of-Order, FR-FCFS |
| DRAM Scheduler Queue Size | 16 |
| DRAM Return Queue Size | 116 |
| DRAM Timing | Hynix H5GQ1H24AFR |
| Min. DRAM Request Latency | 330 Compute Cycles |
| TRANSACTIONAL MEMORY | |
| Validation/Commit BW | 1 Word per Cycle per CU |
| Commit Unit Clock | 700 MHz |
| Concurrency Control | 2 Warps per Core (960 Concurrent Transactions) |
| WARP TM SPECIFIC PARAMETERS | |
| L2 Cache for all Cores | 256 kB × 6 partition = 1536 kB |
| Intra-Warp CD Resources | 4 KB Shared Memory per Warp |
| Intra-Warp CD Mechanism | 2-Phase Parallel Conflict Resolution |
| TCD Last Written Time Table | 16 KB (2048 Entries in 4 Sub Arrays) |
| TCD Detection Granularity | 128 Byte |
| SI-SPECIFIC PARAMETERS | |
| L2 Cache for Cores | 128 KB × 6 partitions = 768 KB |
| Writer Table | 15 KB |
| SRL | 740 KB |
| Timestamp Table | 12 KB |
| VIT | 1 KB |
| Concurrently Active Versions | 8 |
| Row Copy Size | 2 KB per Subarray |
| Row Copy Latency | 68 ns |
| Number of Subarrays | 64 per bank |

Experimental Setup

TABLE 5

Benchmark Properties

| Name | Threads | Read/Write Set Size | Avg. TX Length (Cycles) |
|---|---|---|---|
| LINKED LIST 1 | 100 | 114/4 | 17646 |
| LINKED LIST 2 | 200 | 240/4 | 59876 |
| BINARY TREE 1 | 1000 | 33/8 | 327025 |
| BINARY TREE 2 | 100 | 36/6 | 26910 |
| RED BLACK TREE 1 | 200 | 47/14 | 86501 |
| RED BLACK TREE 2 | 400 | 47/14 | 131218 |
| VACATION 1 | 1.50 | 92/4 | 241258 |
| VACATION 2 | 140 | 144/12 | 338872 |

Embodiments herein extend the WarpTM system using GPGPUSim 3.2.1, which simulates a device resembling the NVidia GTX480. WarpTM also includes the baseline KiloTM, with the difference being that it does not have intra-warp conflict detection.

Applications using dynamically sized data structures that involve many write-read conflicts are used to validate the SI embodiments. These applications are listed in TABLE 2 (above), which are described as follows: Linked List is a linked list, which allows both concurrent insertions and deletions, where the early-release technique is not available. In Linked List 1 and 2 100 and 200 threads are spawned, respectively, each of which inserts one element in the linked list by first iterating to the insertion point then performing the insert. The lists are initially empty.

Binary Tree is a binary search tree with pre-initialized elements, which allows insertion, deletion and query operations. In Binary Tree 1, a tree is initialized with 1000 elements and spawns 1000 threads, each removing one element from the tree. In Binary Tree 2, a tree is initialized with 1000 elements and spawns 100 threads to perform 50 insertion and 50 remove operations.

Red Black Tree is the red-black tree implementation from the RSTM suite, which is adapted to the GPU. In Red Black Tree 1 and Red Black Tree 2 a tree is initialized with 1000 elements and perform 50/50 and 100/100 insertion/remove operations, respectively.

Vacation is the Vacation benchmark from the STAMP benchmark suite, which is adapted to CUDA while keeping the semantics unchanged. It includes its own linked list and red-black tree implementation. Vacation Benchmark simulates a travel reservation system, which includes a database with four tables: Flight, Room, Car and Customers. Each Customer has a linked list storing the reservations made. A reservation points to flight, room or car. Thus, Vacation is similar to having 4 red-black trees and 1 linked list running simultaneously. In Vacation 1 we perform all "table modifying" operations with no user queries, (e.g., entries are added or delete entries in the 4 red-black trees all initialized with a size of 500 entries). In Vacation 2 5 customers are simulated and all threads make reservations for the 5 customers. The table sizes are initialized to be 1000. The benchmarks are run using 4 configurations: (a) WarpTM is a baseline GPU hardware TM, with intra-warp conflict resolution; (b) KiloTM is another pre-existing system, which is WarpTM without intra-warp conflict resolution; (c) SITM_TS is the Snapshot Isolation-enabled TM with loop detection using post-dated timestamps, with the single-writer restriction; and (d) SITM_Oracle is the Snapshot Isolation-enabled TM with perfect loop detection (a dynamic dependence graph in the simulator) with no cost.

There is no single-writer restriction for SITM_Oracle. SITM_Oracle has no cost in post-dating or row copy. This is not achievable in reality. For a fair comparison, WarpTM and KiloTM are given a larger L2 cache as indicated in TABLE 1 (1536 kB), to account for the extra space taken by cyclic conflict detection in SI.

Results

Figure 11:
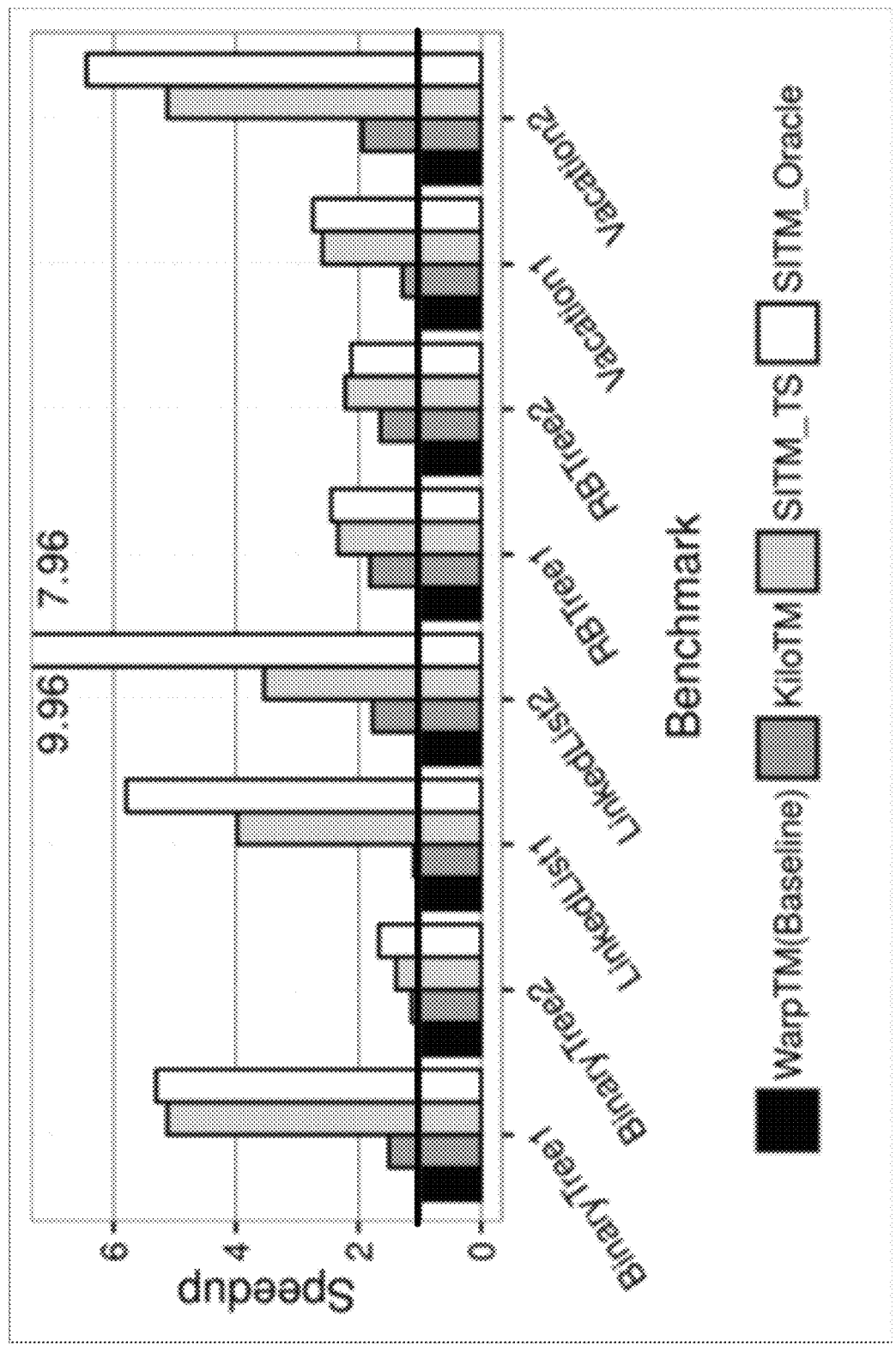
FIG. 11 illustrates, by way of example, overall speedup for benchmarks of a system configured according to embodiment of the present invention.
Figure 12:
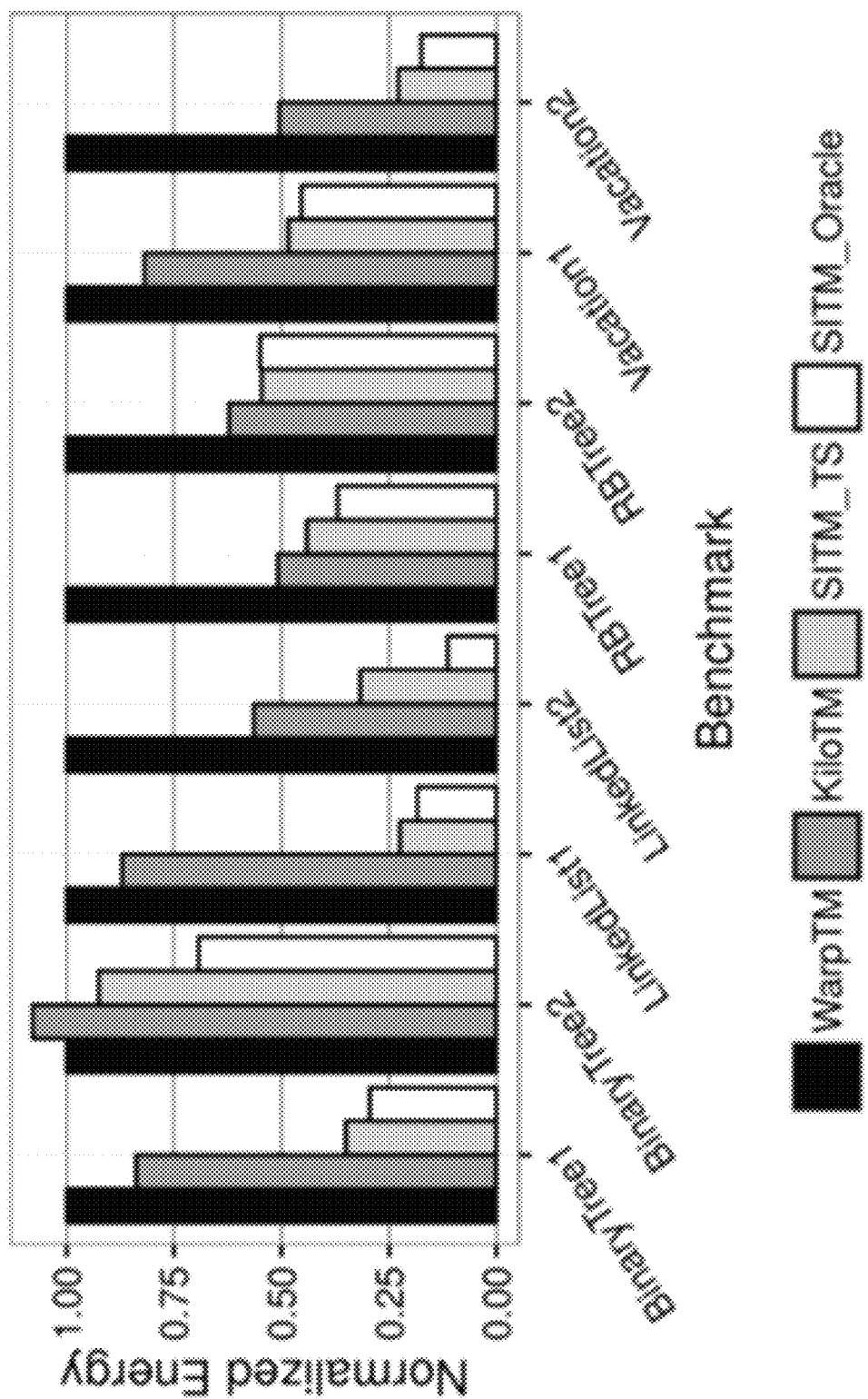
FIG. 12 illustrates, by way of example, energy consumption for benchmarks of a system configured according to an embodiment of the present invention.

FIGS. 11 and 12 respectively show the overall speedup and energy consumption of the benchmarks. Overall, the baseline WarpTM is the slowest among all the benchmarks. In fact, it is slower than KiloTM, which indicates that intra-warp conflict detection based only on address does not help with the benchmarks used in the experiments. Since intra-warp conflict resolution aborts on all write-read conflicts, this may be the reason why it is slower than KiloTM. For the same reason, KiloTM is slower than both SI-based systems because it aborts transactions with write-read conflicts in the CU. This is most obvious in the Linked List benchmarks. By comparing Linked List benchmarks, KiloTM and WarpTM do not scale well; the execution gets serialized in WarpTM and KiloTM.

Speedup for red-black tree and binary tree may be explained in a way resembling linked lists: a branch of a tree is similar to a linked list, but since there exists many branches in a tree, the serialization in a tree is not nearly as serious as in a linked list. However, there may still be enough access patterns like those found in a linked list to allow SI to perform much faster.

In fact, one may also think of graphs as generalized trees which can contain loops. Because the same access pattern is observed in all those data structures, dynamically sized lists, trees and graphs can all benefit from SI. The overall energy consumption is largely affected by the execution time. Although SITM_TS introduces extra power consumption on the Writer Table, Timestamp Table, SRL and VIT, the overall energy consumption is still less than WarpTM due to decreased running time. It can be even significantly lower than KiloTM when the running time difference is large enough, such as in Linked List.

Speedup Analysis

Figure 13:
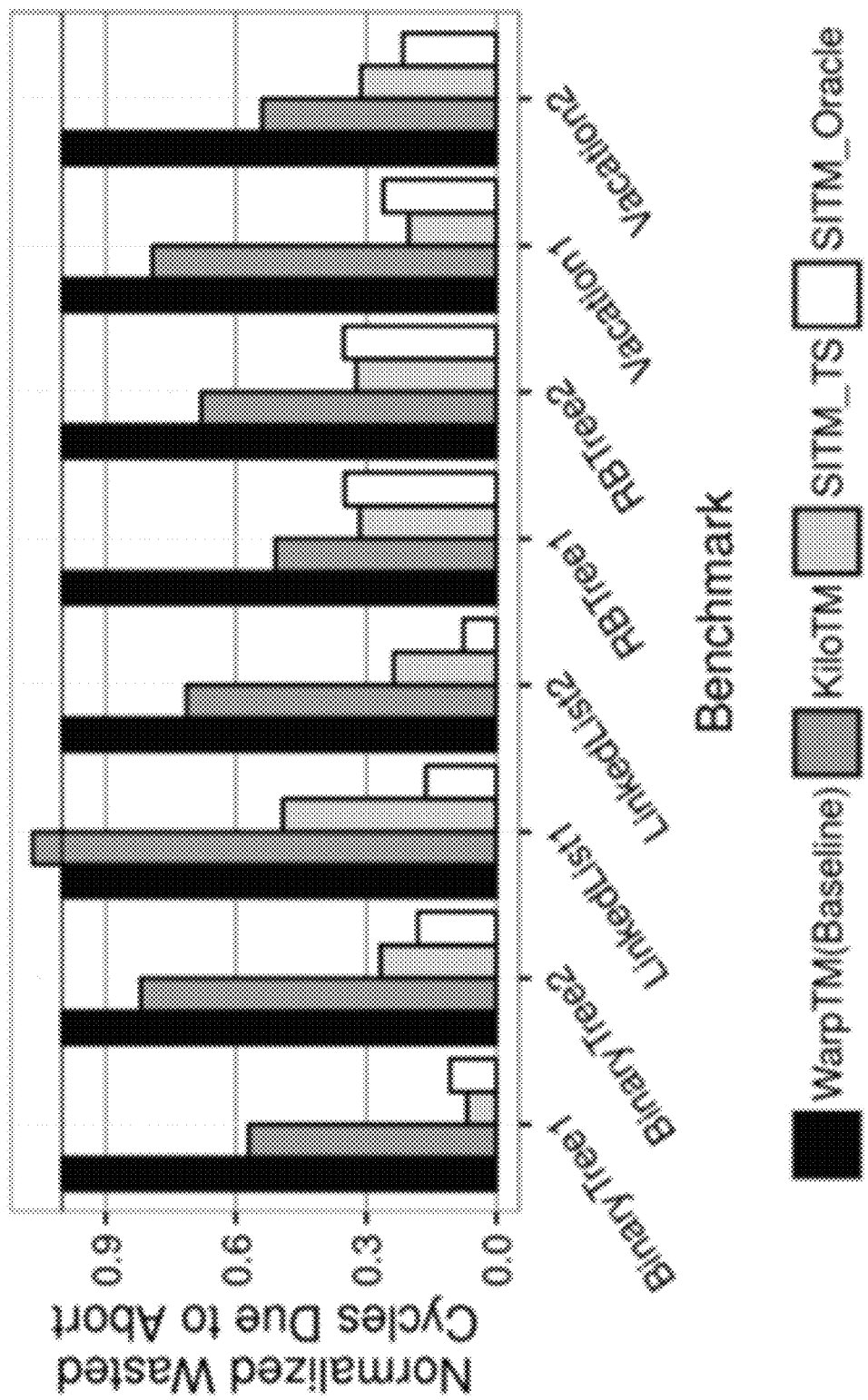
FIG. 13 illustrates, by way of example, normalized wasted cycles due to an abort of a system configured according to an embodiment of the present invention.

A design of SI is to avoid unnecessary write-read aborts. To give a quantitative measure of this, the sum of the duration is computed for all aborted transactions in clock cycles for each of the configurations and normalize them that of the WarpTM baseline, as shown in FIG. 13. The higher the bars are, the more work is wasted on aborted transactions. Overall, the resultant speedup is generally inversely correlated to the amount of work wasted. KiloTM generally resulted in less wasted work than WarpTM, and both SI-based configurations resulted in even less wasted work than KiloTM. To compare SITM_TS and SITM_Oracle: the performance gap between SITM_TS and SITM_Oracle is correlated to the gap between the amount of wasted work of them. When SITM_TS has less or similar amount of wasted work than SITM_Oracle, its performance may be close to that of SITM_Oracle (in benchmarks BinaryTree 1 and 2, RBTree 1 and 2, Vacation 1). When SITM_TS wastes more work than SITM_Oracle, its performance will fall farther behind SITM_Oracle due to the overhead it has compared to SITM_Oracle.

Figure 14:
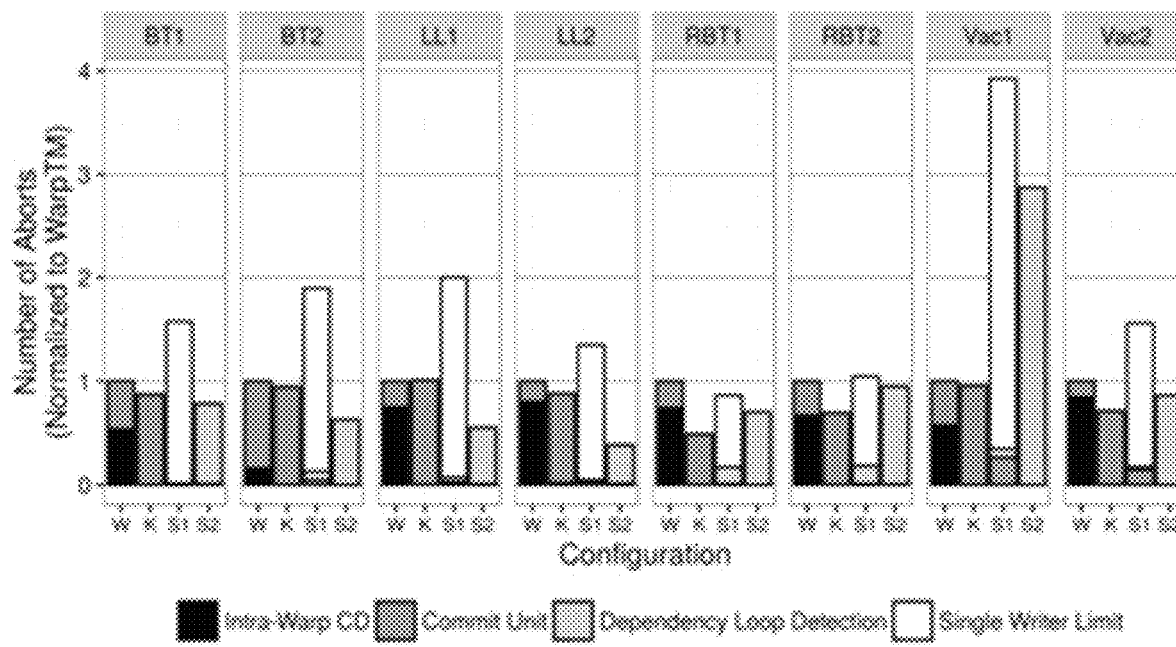
FIG. 14 illustrates, by way of example, the number of aborts caused in each of the benchmarks, normalized to the number of aborts in WarpTM.

FIG. 14 shows the number of aborts caused in each of the benchmarks, normalized to the number of aborts in WarpTM. From the figure, WarpTM often aborts more than KiloTM does; most of them are caused by intra-warp conflict resolution. For SITM_TS, many aborts come from the single-writer restriction. This type of aborts usually happens in early stages of transactions where the transactions have not performed much work. As a result, the length of the aborted transactions tends to be smaller, resulting in a smaller aggregated time even the number of aborted transactions may be larger.

Figure 15:
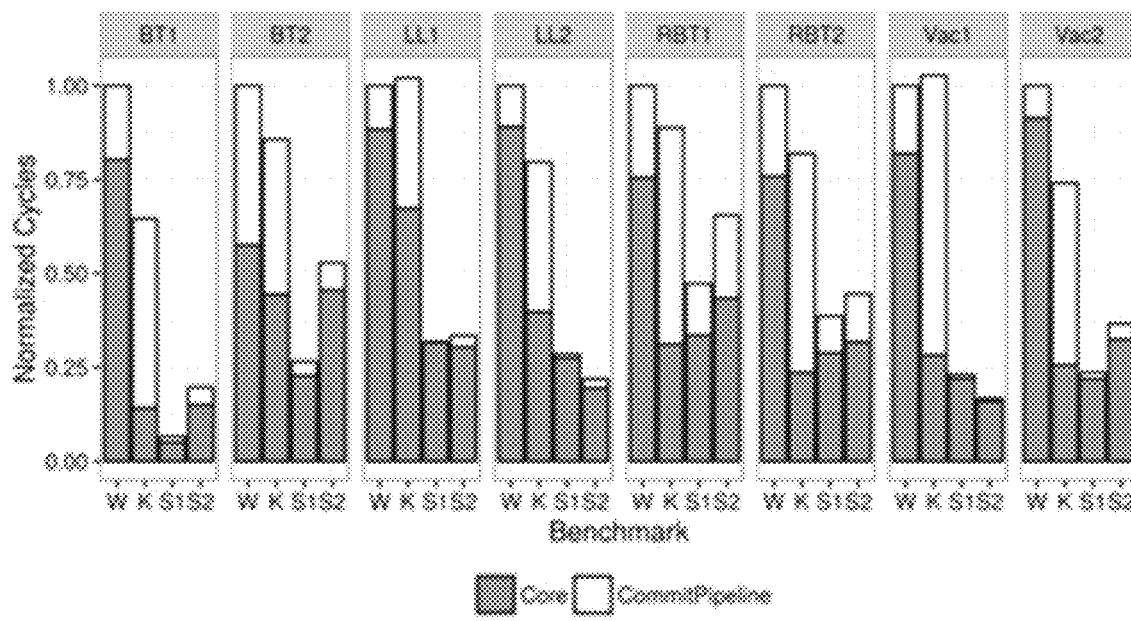
FIG. 15 illustrates, by way of example, the amount of time transactions spend in the CU and the SIMT cores.

FIG. 15 shows the amount of time transactions spend in the CU and the SIMT cores. It can be seen from the figure that the amount of time spent in the CU is shorter in SITM_TS and SITM_Oracle at least because the CU does not need to perform value-based validation for the read sets like in WarpTM and KiloTM (Only the write set needs to be validated in Snapshot Isolation.) As a result, the average durations of both SI-based configurations are shorter than that of both WarpTM and KiloTM, and this can match the observation of aggregate time for aborted transactions in FIG. 13.

It can be seen from FIGS. 14 and 15 that SITM_Oracle reduces the number of aborts for LinkedList 1 and 2, which is as expected. For the other benchmarks, SITM_Oracle resulted in a shorter transaction execution time, which turns into greater speedup. For SITM_TS, the absolute number of aborts may increase due to single-writer limits. Nevertheless, FIG. 15 suggests SITM_TS's aborted transactions tend to be much shorter. Since SITM_TS still allows transactions with read-write conflicts to pass, this will overall results in less wasted work, leading to advantage over non-SI configurations.

Dependency Loop Detection

Figure 16:
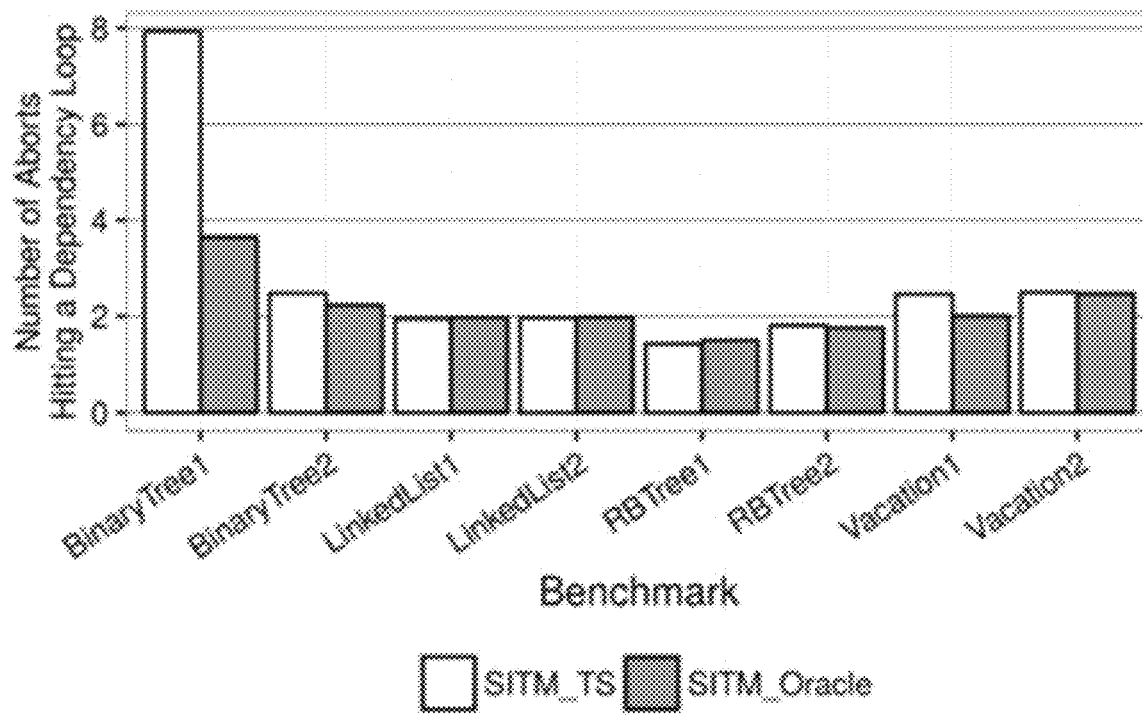
FIG. 16 illustrates, by way of example, the number of loop-breaking aborts received per dependency loop.

FIG. 16 shows the number of loop-breaking aborts received per dependency loop. The numbers are the outcome of two factors: 1) how much do the loops themselves overlap and 2) the false-alarm rate. When the loops overlap more, it is more likely that one aborted transaction breaks more than one loop. False alarms may also cause a dependency loop to receive more than one abort. Overall, the number of aborts per dependency loop does not show a great difference between SITM_TS and SITM_Oracle except in BinaryTree1: In the early stages of this benchmark, many transactions attempt to replace the parent of a tree node with the next largest element in the tree, resulting in many writes to the same addresses. This causes the gap in the number of aborts between to SITM_TS and SITM_Oracle to widen, which contributed to the difference in the overall numbers of aborts per dependency loop. In later stages of the benchmark as well as in other benchmarks, the difference between the number of aborts of SITM_TS and SITM_Oracle is more stable, resulting in similar numbers of aborts per loop.

Figure 17:
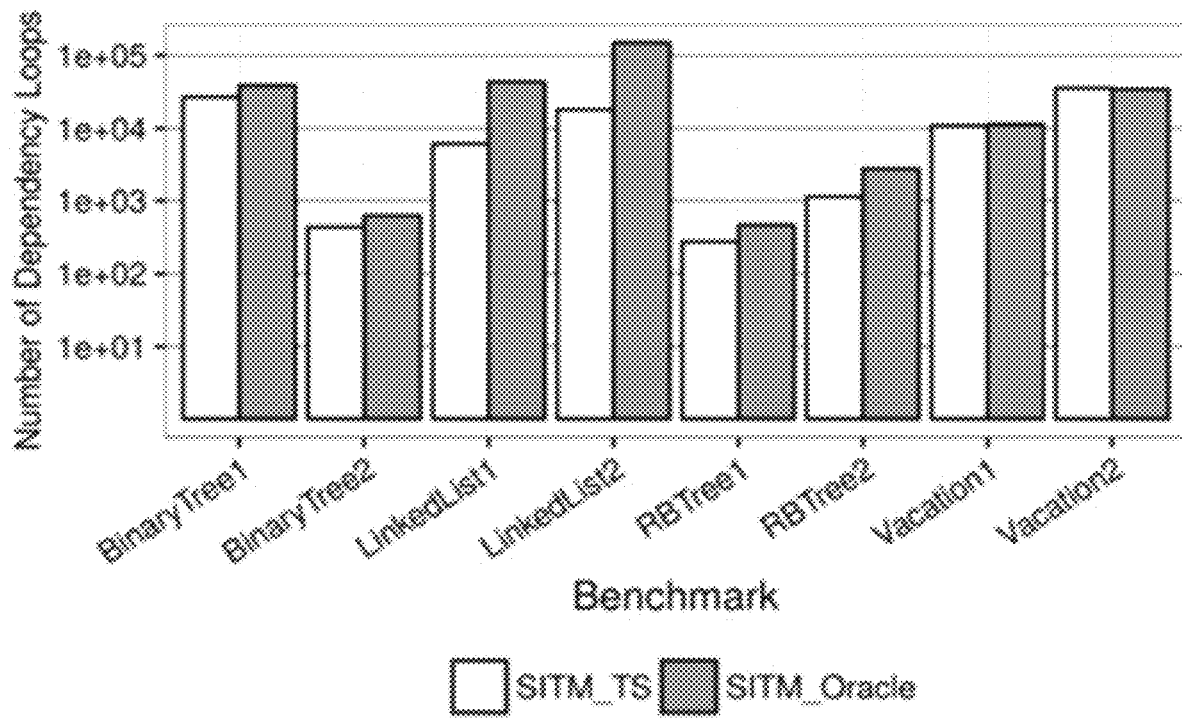
FIG. 17 illustrates, by way of example, the total number of possible dependency loops that can ever be formed by all transactions throughout the benchmark lifetime.

FIG. 17 shows the total number of possible dependency loops that can ever be formed by all transactions throughout the benchmark lifetime. The number for SITM_TS is much smaller than that of SITM_Oracle. The reason is many transactions are aborted due to single-writer abort, such that the transactions could not have the chance to overlap with other transactions to form dependency loops. This also suggests although the purpose of the single-writer restriction is to keep post-dating scalable, it also eliminates much potential dependency loops by coincidence by aborting transactions.

Sensitivity to Number of Versions and Postdating Delta

Figure 18:
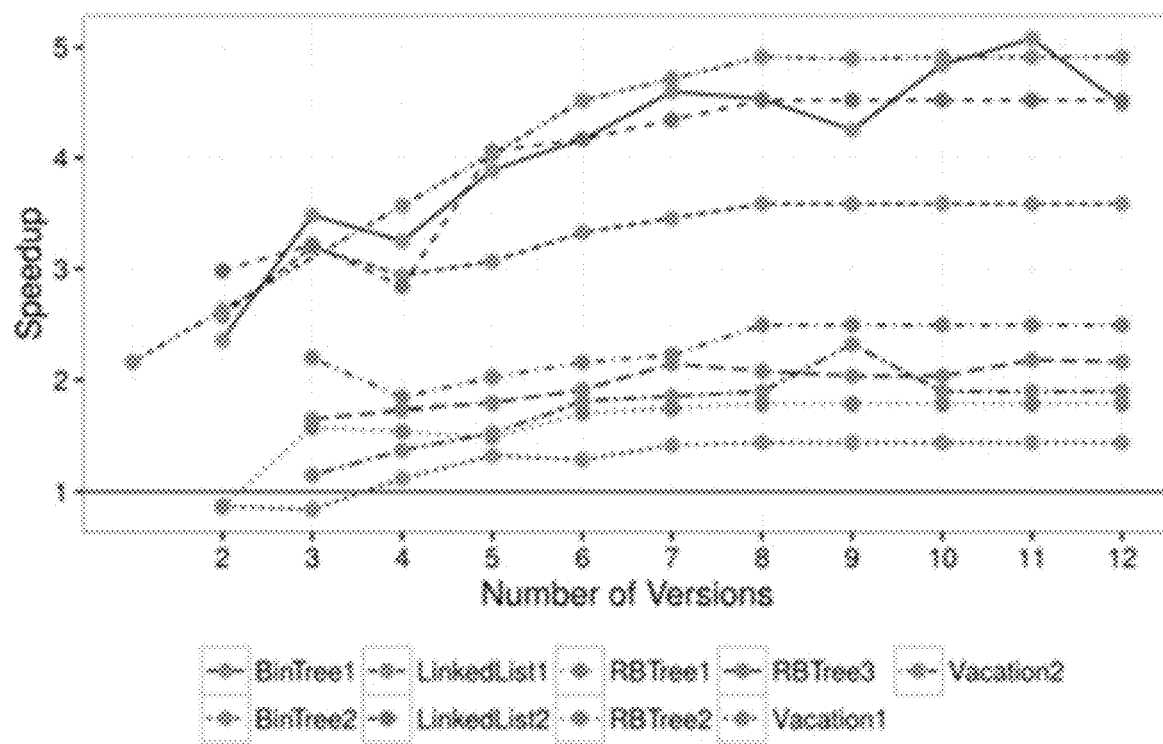
FIG. 18 illustrates, by way of example, a study performed on how the number of concurrently available versions affects overall performance.

A study was performed on how the number of concurrently available versions affects overall performance, shown in FIG. 18. The results suggest that a larger number of concurrently available versions will generally imply better performance. This is because with more versions available, transactions can see more recent snapshots. On the contrary, with fewer versions available, transactions are more likely to see stale snapshots, which can turn into more frequent write-write conflicts. For example, when inserting into a linked list, a more recent snapshot will contain a longer linked list. A longer list is more likely to cause the insertion operations to modify addresses farther away from each other, lowering the chance of conflict.

As is shown in FIG. 18, a concurrent version number of 8 results in near-optimal performance, we consider it to be the balance between performance and cost and decide to use this number in our experiments.

Figure 19:
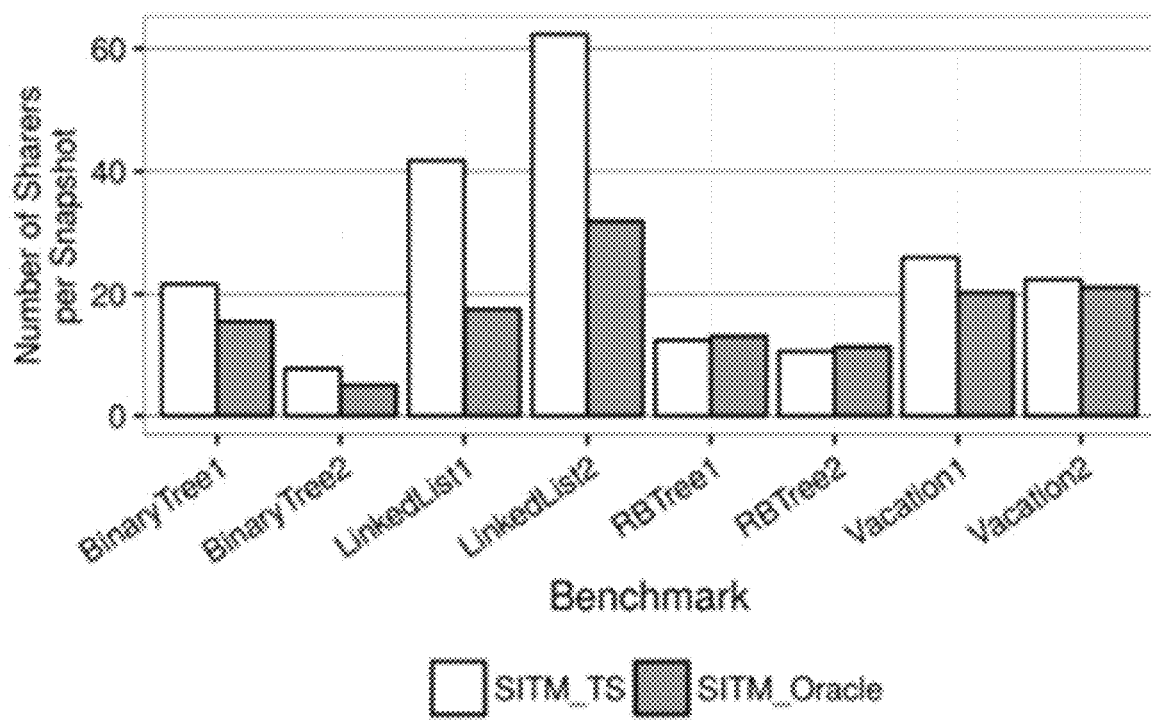
FIG. 19 illustrates, by way of example, there are many transactions that read from the same snapshot.

FIG. 19 shows there are many transactions that read from the same snapshot, which is a result of the high-level parallelism on the GPU. In addition to the high-level parallelism, transactions on a GPU are run in warps which execute in lock-step, so that all transactions in a warp start at the same time step, thus sharing the same snapshot. The large number of transactions overlapping in time means many commits of the transactions may be merged together, reducing the number of version creation and row-level copy needed, lowering the amortized cost of such operations. This is an example where a high degree of parallelism doesn't necessarily mean a high cost in versioning.

A choice of the post-dating delta (which is 10 in the pseudocode presented above) does not have a significant influence on the overall speedup.

Test Conclusion

The SI mechanism has been applied to a GPU-based hardware TM system. With a feasible mechanism for creating versions quickly and detecting dependency loop, this system can work out well for applications involving linked lists, binary search trees, red-black trees, achieving speedup over systems using conventional conflict detection mechanism. This can be expanded to the use cases for TM systems on the GPU: It will no longer only handle small and fixed-size transactions, but large ones with dynamically-sized, complex data structures as well.

Computer System

Figure 20:
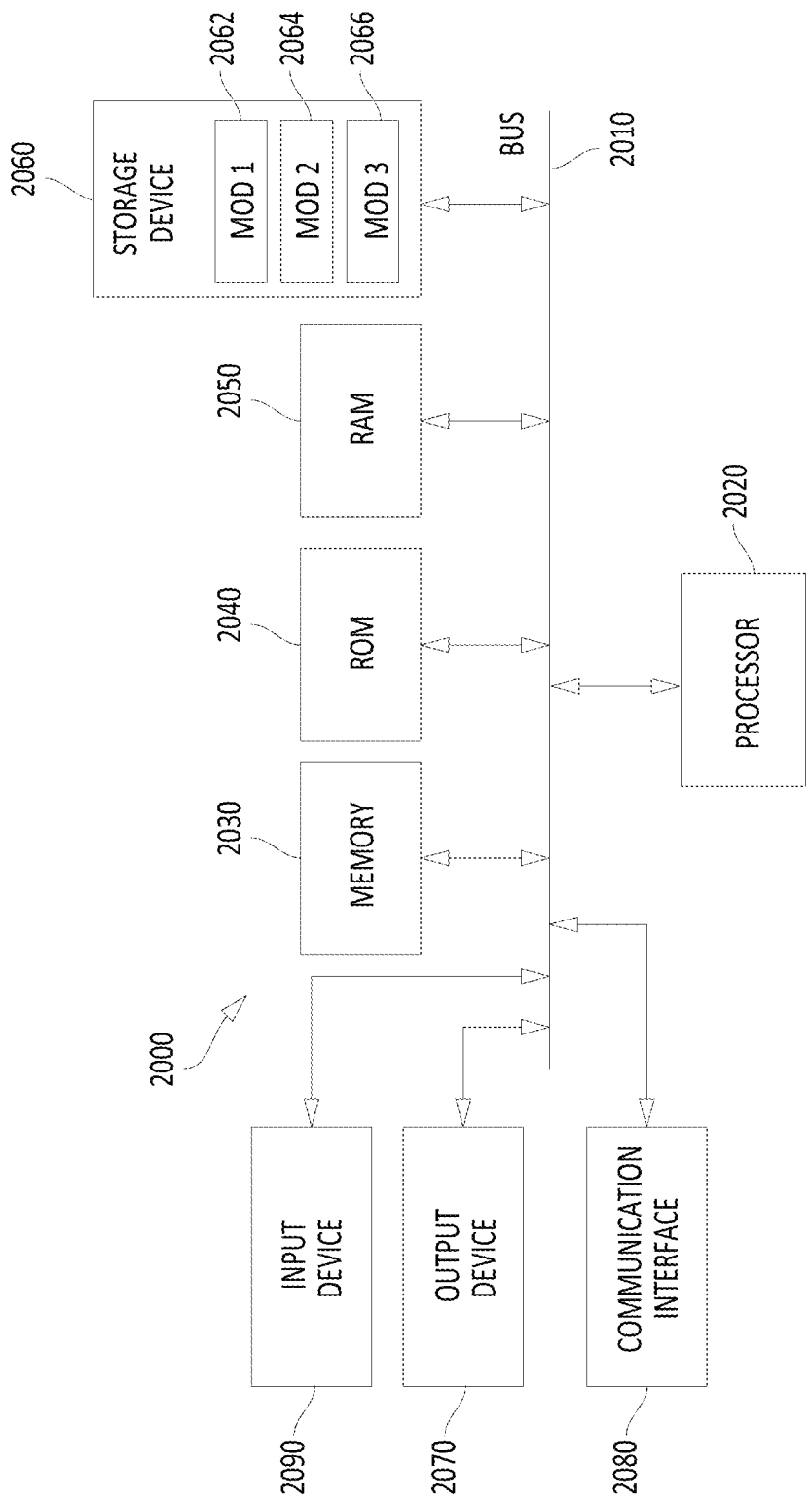
FIG. 20 illustrates an example computer system.

With reference to FIG. 20, an exemplary system includes a general-purpose computing device 2000, including a processing unit (CPU or processor) 2020 and a system bus 2010 that couples various system components including the system memory 2030 such as read-only memory (ROM) 2040 and random access memory (RAM) 2050 to the processor 2020. The system 2000 can include a cache of high-speed memory connected directly with, in close proximity to, or integrated as part of the processor 2020. The system 2000 copies data from the memory 2030 and/or the storage device 2060 to the cache for quick access by the processor 2020. In this way, the cache provides a performance boost that avoids processor 2020 delays while waiting for data. These and other modules can control or be configured to control the processor 2020 to perform various actions. Other system memory 2030 may be available for use as well. The memory 2030 can include multiple different types of memory with different performance characteristics. It can be appreciated that the disclosure may operate on a computing device 2000 with more than one processor 2020 or on a group or cluster of computing devices networked together to provide greater processing capability. The processor 2020 can include any general purpose processor and a hardware module or software module, such as module 1 2062, module 2 2064, and module 3 2066 stored in storage device 2060, configured to control the processor 2020 as well as a special-purpose processor where software instructions are incorporated into the actual processor design. The processor 2020 may essentially be a completely self-contained computing system, containing multiple cores or processors, a bus, memory controller, cache, etc. A multi-core processor may be symmetric or asymmetric.

The system bus 2010 may be any of several types of bus structures including a memory bus or memory controller, a peripheral bus, and a local bus using any of a variety of bus architectures. A basic input/output (BIOS) stored in ROM 2040 or the like, may provide the basic routine that helps to transfer information between elements within the computing device 2000, such as during start-up. The computing device 2000 further includes storage devices 2060 such as a hard disk drive, a magnetic disk drive, an optical disk drive, tape drive or the like. The storage device 2060 can include software modules 2062, 2064, 2066 for controlling the processor 2020. Other hardware or software modules are contemplated. The storage device 2060 is connected to the system bus 2010 by a drive interface. The drives and the associated computer-readable storage media provide non-volatile storage of computer-readable instructions, data structures, program modules and other data for the computing device 2000. In one aspect, a hardware module that performs a particular function includes the software component stored in a tangible computer-readable storage medium in connection with the necessary hardware components, such as the processor 2020, bus 2010, display 2070, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 2000 is a small, handheld computing device, a desktop computer, or a computer server.

Although the exemplary embodiment described herein employs the hard disk 2060, other types of computer-readable media which can store data that are accessible by a computer, such as magnetic cassettes, flash memory cards, digital versatile disks, cartridges, random access memories (RAMs) 2050, and read-only memory (ROM) 2040, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 2000, an input device 2090 represents any number of input mechanisms, such as a microphone for speech, a touch-sensitive screen for gesture or graphical input, keyboard, mouse, motion input, speech and so forth. An output device 2070 can also be one or more of a number of output mechanisms known to those of skill in the art. In some instances, multimodal systems enable a user to provide multiple types of input to communicate with the computing device 2000. The communications interface 2080 generally governs and manages the user input and system output. There is no restriction on operating on any particular hardware arrangement and therefore the basic features here may easily be substituted for improved hardware or firmware arrangements as they are developed.

The steps outlined herein are exemplary and can be implemented in any combination thereof, including combinations that exclude, add, or modify certain steps.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A method comprising:
  receiving, at a cache associated with a processor, a request from a single-instruction, multiple-transaction (SIMT) core of the processor;
  generating, in response to the request, at least one copy of a row of a memory associated with the processor, the at least one copy stored in the cache;
  recording, during transactions executed by the processor, multiple versions of the row of the memory, each version in the multiple versions associated with a respective copy in the at least one copy of the row of the memory;
  generating a version index table of the multiple versions, the version index table being written by a single writer within the cache, the version index table being stored in the cache;
  performing, at the cache, dependent loop detection on the multiple versions; and
  aborting write-write transactions based on the dependent loop detection.

2. The method of claim 1, further comprising:
  recycling versions which are not referenced by the transactions executed by the processor.

3. The method of claim 1, wherein the dependent loop detection further comprises:
  identifying order timestamps associated with each transaction in a pair of transactions associated with an address of the memory;
  identifying a current transaction order timestamp of a first transaction which is out of order with a post-dated logical timestamp of a second transaction, to yield an incorrect order; and
  identifying a dependent loop based on the incorrect order.

4. The method of claim 1, further comprising:
  executing transactions which are not the write-write transactions, wherein executed transactions respectively modify a version of the multiple versions; and
  recording the version of the memory as a current, system version for a subsequent iteration.

5. The method of claim 1, wherein the processor is part of a graphical processing unit.

6. A graphical processing unit comprising:
  at least one processor; and
  at least one non-transitory memory device having a cache, wherein the at least one non-transitory memory device is configured to perform operations in association with the at least one processor, the operations comprising:
    receiving, at the cache, a request from a single-instruction, multiple-transaction (SIMT) core of the at least one processor;
    generating, in response to the request, at least one copy of a row of memory within the at least one non-transitory memory device, the at least one copy stored in the cache;
    recording, during transactions executed by the at least one processor, multiple versions of the row of memory within the at least one non-transitory memory device, each version in the multiple versions associated with a respective copy in the at least one copy of the row of memory within the at least one non-transitory memory device;
    generating a version index table of the multiple versions, the version index table being written by a single writer within the cache, the version index table being stored in the cache;
    performing, at the cache, dependent loop detection on the multiple versions; and
    aborting write-write transactions based on the dependent loop detection.

7. The graphical processing unit of claim 6, wherein the at least one non-transitory memory device is further configured to perform operations comprising:
  recycling versions which are not referenced by the transactions executed by the processor.

8. The graphical processing unit of claim 6, wherein the dependent loop detection further comprises:

identifying order timestamps associated with each transaction in a pair of transactions associated with an address of the at least one non-transitory memory device;

identifying a current transaction order timestamp of a first transaction which is out of order with a post-dated logical timestamp of a second transaction, to yield an incorrect order; and identifying a dependent loop based on the incorrect order.

9. The graphical processing unit of claim 6, wherein the at least one non-transitory memory device is further configured to perform operations comprising:

executing transactions which are not the write-write transactions, wherein executed transactions respectively modify a version of the multiple versions; and recording the version of the memory as a current, system version for a subsequent iteration.

10. A non-transitory computer-readable storage device having instructions which, when executed by a computing device, cause the computing device to perform operations comprising:

receiving, at a cache, a request from a single-instruction, multiple-transaction (SIMT) core of the computing device;

generating, in response to the request, at least one copy of a row of memory associated with the computing device, the at least one copy stored in the cache;

recording, during transactions executed by the computing device, multiple versions of the row of the memory, each version in the multiple versions associated with a respective copy;

generating a version index table of the multiple versions, the version index table being written by a single writer within the cache, the version index table being stored in the cache;

performing, at the cache, dependent loop detection on the multiple versions; and aborting write-write transactions based on the dependent loop detection.

11. The non-transitory computer-readable storage device of claim 10, having additional instructions stored which, when executed by the computing device, cause the computing device to perform operations comprising:

recycling versions which are not referenced by the transactions executed by the processor.

12. The non-transitory computer-readable storage device of claim 10, wherein the dependent loop detection further comprises:

identifying order timestamps associated with each transaction in a pair of transactions associated with an address of the memory;

identifying a current transaction order timestamp of a first transaction which is out of order with a post-dated logical timestamp of a second transaction, to yield an incorrect order; and identifying a dependent loop based on the incorrect order.

13. The non-transitory computer-readable storage device of claim 10, having additional instructions stored which, when executed by the computing device, cause the computing device to perform operations comprising:

executing transactions which are not the write-write transactions, wherein executed transactions respectively modify a version of the multiple versions; and recording the version of the memory as a current, system version for a subsequent iteration.

14. The non-transitory computer-readable storage device of claim 10, wherein the computing device is a graphical processing unit.

* * * * *